US011386303B2

(12) United States Patent
Brent et al.

(10) Patent No.: US 11,386,303 B2
(45) Date of Patent: Jul. 12, 2022

(54) PROCEDURAL LANGUAGE AND CONTENT GENERATION ENVIRONMENT FOR USE IN AUGMENTED REALITY/MIXED REALITY SYSTEMS TO SUPPORT LABORATORY AND RELATED OPERATIONS

(71) Applicant: LabLightAR, Inc., Seattle, WA (US)

(72) Inventors: Roger Brent, Seattle, WA (US); Jamie Douglas Tremaine, Toronto (CA); John Max Kellum, Seattle, WA (US)

(73) Assignee: LabLightAR, Inc., Seattle, WA (US)

( * ) Notice: Subject to any disclaimer, the term of this patent is extended or adjusted under 35 U.S.C. 154(b) by 0 days.

(21) Appl. No.: 17/179,208

(22) Filed: Feb. 18, 2021

(65) Prior Publication Data

US 2021/0182627 A1    Jun. 17, 2021

Related U.S. Application Data

(63) Continuation of application No. 15/929,083, filed on Jan. 4, 2019, now Pat. No. 10,963,750.
(Continued)

(51) Int. Cl.
*G06K 9/62* (2022.01)
*G06F 8/34* (2018.01)
(Continued)

(52) U.S. Cl.
CPC .............. *G06K 9/6267* (2013.01); *G06F 8/34* (2013.01); *G06F 8/38* (2013.01); *G06K 9/627* (2013.01);
(Continued)

(58) Field of Classification Search
CPC .. G06K 9/6267; G06K 9/627; G06K 9/00671; G06F 8/34; G06F 8/38;
(Continued)

(56) References Cited

U.S. PATENT DOCUMENTS 4,804,949 A    2/1989  Faulkerson
7,477,993 B2   1/2009  Sunshine et al.
(Continued)

FOREIGN PATENT DOCUMENTS

WO    2016169871 A1    10/2016
WO    2018106289 A1    6/2018

OTHER PUBLICATIONS

U.S. Appl. No. 17/119,531, dated Dec. 11, 2020, Roger Brent.
(Continued)

*Primary Examiner* — Amandeep Saini
(74) *Attorney, Agent, or Firm* — Rowan TELS LLC; Charles A. Mirho

(57) ABSTRACT

A method of operating a procedural language and content generation system that involves correlating environment objects and object movement to input controls through operation of a correlator, operating an interpreter to evaluate the correlation of the input controls and object/object movement against known libraries to generate programmatic instructions, storing the programmatic instructions as an instruction set, transforming the instruction set into executable commands through a compiler, and configuring control logic to perform the executable commands in response to receiving detected environment objects and detected object movement from an image processor.

18 Claims, 25 Drawing Sheets

Related U.S. Application Data

(60) Provisional application No. 62/613,732, filed on Jan. 4, 2018.

(51) Int. Cl.
| | |
|---|---|
| *G09B 19/00* | (2006.01) |
| *G06N 3/08* | (2006.01) |
| *G06F 8/38* | (2018.01) |
| *G06V 20/20* | (2022.01) |

(52) U.S. Cl.
CPC ............ *G06N 3/08* (2013.01); *G06V 20/20* (2022.01); *G09B 19/0069* (2013.01)

(58) Field of Classification Search
CPC ........ G09B 19/0069; G09B 5/02; G06N 3/08; G06N 20/10; G06N 7/005; G06N 3/084; G06N 3/0454; G06N 3/0445; G06N 3/0481; G06V 20/20; G06V 10/82
USPC ........................................................ 382/103
See application file for complete search history.

(56) References Cited

U.S. PATENT DOCUMENTS

| | | | |
|---|---|---|---|
| 9,418,416 B2 | 8/2016 | Milne et al. | |
| 10,467,534 B1 | 11/2019 | Brent et al. | |
| 10,706,626 B1* | 7/2020 | Brent | ...................... G06F 3/011 |
| 10,963,750 B2 | 3/2021 | Brent et al. | |
| 2005/0010106 A1 | 1/2005 | Lang et al. | |
| 2007/0211928 A1 | 9/2007 | Weng et al. | |
| 2011/0187746 A1 | 8/2011 | Suto et al. | |
| 2012/0184840 A1 | 7/2012 | Najarian et al. | |
| 2013/0010068 A1* | 1/2013 | Tiernan | .................. G06K 9/228 |
| | | | 348/46 |
| 2013/0071875 A1 | 3/2013 | Zemer et al. | |
| 2014/0233798 A1* | 8/2014 | Cho | ........................ G06T 7/246 |
| | | | 382/103 |
| 2015/0342551 A1 | 12/2015 | Lavi et al. | |
| 2016/0203648 A1 | 7/2016 | Bilbrey et al. | |
| 2018/0204160 A1 | 7/2018 | Chehade et al. | |
| 2019/0228269 A1 | 7/2019 | Brent et al. | |
| 2021/0182627 A1 | 6/2021 | Brent et al. | |

OTHER PUBLICATIONS

FSP1128PCT_ISR 02082021.
FSP1128PCT_WO 02082021.
Kloss et al. "LIGGGHTS and CFDEM coupling—Modelling of macroscopic particle processes based on LAMMPS technology", 2013 (Year: 2013).
U.S. Appl. No. 17/179,208, dated Feb. 18, 2021, Roger Brent.
FSP1700_NPL_FSP1128PCTSearchReport.

\* cited by examiner

US 11,386,303 B2

PROCEDURAL LANGUAGE AND CONTENT GENERATION ENVIRONMENT FOR USE IN AUGMENTED REALITY/MIXED REALITY SYSTEMS TO SUPPORT LABORATORY AND RELATED OPERATIONS

This Application, having U.S. Ser. No. 17/179,208, claims priority and benefit as a continuation of application U.S. Ser. No. 15/929,083, filed on Jan. 4, 2019. Application Ser. No. 15/929,083 claims priority and benefit under 35 USC 119(e) to U.S. application Ser. No. U.S. 62/613,732, filed on Jan. 4, 2018. The content of each of U.S. Ser. No. 15/929,083 and U.S. 62/613,732 is incorporated herein by reference in its entirety.

This application claim priority under 35 U.S.C. 119 to the provisional application U.S. 62/613,732 filed on Jan. 4, 2018.

BACKGROUND

The creation of content for augmented reality (AR) devices currently suffers from various shortcomings. In particular, current content creation methods lack user friendly authoring tools, requiring the content creator to write complex code. This shortcoming is especially apparent in the creation of procedural content, content that offers some measure of guidance delivered via the functions of the AR device that directs the user through the steps of a procedure to which the user adheres rigidly or loosely, whose execution also requires actions by the operator requiring use of the operator's hands, which calls for the use of the various additional functions of the AR device to retrieve relevant information and may require deposition of new information in in appropriate digital repositories. Therefore, it is obvious a need exists for an AR content creation system that is better supports all levels of content creators, from those without a programming background to those who are experienced in content creation.

BRIEF SUMMARY

Disclosed herein are systems to facilitate the use of augmented reality (AR) devices to assist laboratory and other workers in the performance of laboratory and other work procedures normally requiring guidance. The systems utilize specific and intuitive controlled—vocabulary high level procedural languages, dedicated content generation environments, and other means including specific user interface elements designed to enable better human performance.

In the context of biomedical R&D, systems aiding generation of procedural content may aid laboratory training, performance of new procedures with which the investigator is unfamiliar, single person (autonomous) work within the lab, collaborative interaction with other lab workers, operation of instrumentation, and other activities for which guidance in performing procedures is useful.

Certain aspects of the functionality of the AR device such as object classification and object tracking may be carried out by a neural network, a combination of neural networks that may include, but are not limited to, convolutional neural networks (CNNs), Recurrent neural networks (RNNs), Generative adversarial networks (GANs), etc.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
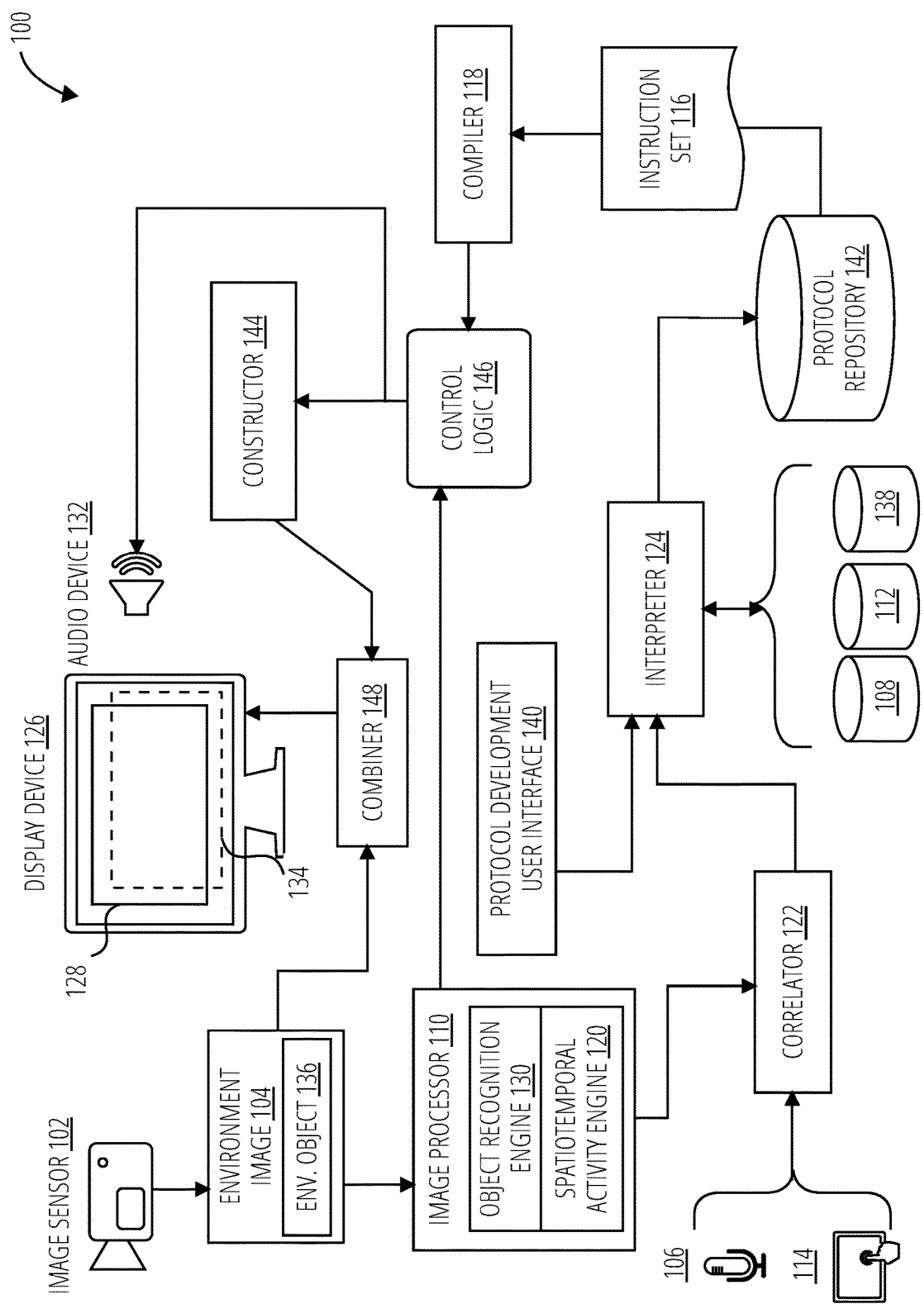
FIG. 1 illustrates a procedural language and content generation system 100 in accordance with one embodiment.

"Combiner" refers to a logic element that combines two or more inputs into fewer (often a single) output. Example hardware combiners are arithmetic units (adders, multipliers, etc.), time-division multiplexers, and analog or digital modulators (these may also be implemented is software or firmware). Another type of combiner builds an association table or structure (e.g., a data structure instance having members set to the input values) in memory for its inputs. For example: val1, val2, val3→combiner logic→{val1, val2, val3} set.val1=val1; set.val2=val2; set.val3=val3; Other examples of combiners will be evident to those of skill in the art without undo experimentation.

"compiler" refers to logic that converts instructions into a machine-code or lower-level form so that they can be read and executed by a computer.

"correlator" refers to a logic element that identifies a configured association between its inputs. One examples of a correlator is a lookup table (LUT) configured in software or firmware. Correlators may be implemented as relational databases. An example LUT correlator is: |low_alarm_condition|low_threshold_value| 0| |safe_condition|safe_lower_bound|safe_upper_bound|  |high_alarm_condition|high_threshold_value| 0| Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"engine" refers to logic or collection of logic modules working together to perform fixed operations on a set of inputs to generate a defined output. For example, IF (engine.logic {get.data( ),process.data( ),store.data( ),} get.data (input1)→data.input1; process.data(data.input1)→formatted.data1→store.data(formatted.data1). A characteristic of some logic engines is the use of metadata that provides models of the real data that the engine processes. Logic modules pass data to the engine, and the engine uses its metadata models to transform the data into a different state.

"virtual reality" refers to computer-generated simulation of a three-dimensional environment that can be interacted with in a seemingly real or physical way by a person using special electronic equipment, such as a headset with a display and gloves fitted with sensors.

"augmented/mixed reality" refers to refers to technology that superimposes computer-generated images and sounds on a user's view of the real world and field of hearing, thus providing a composite visual and aural environment.

"virtualize" refers to converting a physical thing to a computer-generated simulation of that thing. It also means to "reify" abstract things like numbers, inputs or control surfaces into visual or aural things.

"Adam optimizer" refers to an optimization algorithm that can used instead of the classical stochastic gradient descent procedure to update network weights iterative based in training data. Stochastic gradient descent maintains a single learning rate (termed alpha) for all weight updates and the learning rate does not change during training. A learning rate is maintained for each network weight (parameter) and separately adapted as learning unfolds. Adam as combining the advantages of two other extensions of stochastic gradient descent. Specifically, Adaptive Gradient Algorithm (AdaGrad) that maintains a per-parameter learning rate that improves performance on problems with sparse gradients (e.g. natural language and computer vision problems), and Root Mean Square Propagation (RMSProp) that also maintains per-parameter learning rates that are adapted based on the average of recent magnitudes of the gradients for the weight (e.g. how quickly it is changing). This means the algorithm does well on online and non-stationary problems (e.g. noisy). Adam realizes the benefits of both AdaGrad and RMSProp. Instead of adapting the parameter learning rates based on the average first moment (the mean) as in RMSProp, Adam also makes use of the average of the second moments of the gradients (the uncentered variance). Specifically, the algorithm calculates an exponential moving average of the gradient and the squared gradient, and the parameters beta1 and beta2 control the decay rates of these moving averages. The initial value of the moving averages and beta1 and beta2 values close to 1.0 (recommended) result in a bias of moment estimates towards zero. This bias is overcome by first calculating the biased estimates before then calculating bias-corrected estimates.

"CTC loss function" refers to connectionist temporal classification, a type of neural network output and associated scoring function, for training recurrent neural networks (RNNs) such as LSTM networks to tackle sequence problems where the timing is variable. A CTC network has a continuous output (e.g. softmax), which is fitted through training to model the probability of a label. CTC does not attempt to learn boundaries and timings: Label sequences are considered equivalent if they differ only in alignment, ignoring blanks. Equivalent label sequences can occur in many ways—which makes scoring a non-trivial task. Fortunately there is an efficient forward-backward algorithm for that. CTC scores can then be used with the back-propagation algorithm to update the neural network weights. Alternative approaches to a CTC-fitted neural network include a hidden Markov model (HMM).

"Gated Recurrent Unit (GRU)" refers to are a gating mechanism in recurrent neural networks. GRUs may exhibit better performance on smaller datasets than do LSTMs. They have fewer parameters than LSTM, as they lack an output gate.

"Beam search" refers to a heuristic search algorithm that explores a graph by expanding the most promising node in a limited set. Beam search is an optimization of best-first search that reduces its memory requirements. Best-first search is a graph search which orders all partial solutions (states) according to some heuristic. But in beam search, only a predetermined number of best partial solutions are kept as candidates. It is thus a greedy algorithm. Beam search uses breadth-first search to build its search tree. At each level of the tree, it generates all successors of the states at the current level, sorting them in increasing order of heuristic cost. However, it only stores a predetermined number, (3, of best states at each level (called the beam width). Only those states are expanded next. The greater the beam width, the fewer states are pruned. With an infinite beam width, no states are pruned and beam search is identical to breadth-first search. The beam width bounds the memory required to perform the search. Since a goal state could potentially be pruned, beam search sacrifices completeness (the guarantee that an algorithm will terminate with a solution, if one exists). Beam search is not optimal (that is, there is no guarantee that it will find the best solution). In general, beam search returns the first solution found. Beam search for machine translation is a different case: once reaching the configured maximum search depth (i.e. translation length), the algorithm will evaluate the solutions found during search at various depths and return the best one (the one with the highest probability). The beam width can either be fixed or variable. One approach that uses a variable beam width starts with the width at a minimum. If no solution is found, the beam is widened and the procedure is repeated.

A method of operating a procedural language and content generation system may involve correlating environment objects and object movement detected through an image processor to input controls through operation of a correlator. The method may operate an interpreter.

The interpreter may evaluate an input set from a protocol development user interface against a known objects library, a protocol library, and declared objects. The interpreter may evaluate correlation of the input controls, the environment objects, and the object movement against the known objects library, the protocol library, and the declared objects. The interpreter may generate programmatic instructions. The method may store the programmatic instructions as an instruction set within a protocol repository. The method may transform the instruction set into executable commands through operation of a compiler. The method may configure control logic to perform the executable commands in response to receiving detected environment objects and detected object movement from the image processor. The method may operate an audio device in response to at least one executed command performed by the control logic. The method may operate a constructor to generate an augmented reality layer in response to the at least one executed command performed by the control logic. The method may overlay the augmented reality layer over an environment image layer through operation of a combiner. The method may display the augmented reality layer above the environment image layer in a display device.

In some configurations, the method may involve correlating the environment image layer and the augmented reality layer of an in progress instruction set to an edit control through operation of the correlator. The method may operate the interpreter. The interpreter may evaluate correlation of the edit control, the environment image layer, and the augmented reality layer against the known objects library, the protocol library, the declared objects, and stored programmatic instructions for the in progress instruction set. The interpreter may generate revised programmatic instructions. The method may store the revised programmatic instructions as a revised instruction set within the protocol repository. The method may transform the instruction set into the executable commands through operation of the compiler. The method may configure the control logic to perform the executable commands in response to receiving the detected environment objects and the detected object movement from the image processor. The method may operate the audio device in response to the at least one executed command performed by the control logic. The method may operate the constructor to generate a revised augmented reality layer in response to the at least one executed command performed by the control logic. The method may overlay the revised augmented reality layer over the environment image layer through operation of the combiner. The method may display the revised augmented reality layer above the environment image layer in the display device.

In some configurations, the image processor comprises an object recognition engine and a spatiotemporal activity engine. The object recognition engine and the spatiotemporal activity engine utilizes at least one neural network for detecting and classifying the environment objects and tracking the object movement.

In some configurations, the protocol development user interface generates a flow diagram.

In some configurations, the protocol development user interface generates a three dimensional protocol workflow.

A computing apparatus, the computing apparatus includes a processor and a memory storing instructions that, when executed by the processor, configure the apparatus to correlate environment objects and object movement detected through an image processor to input controls through operation of a correlator. The instructions configure the apparatus to operate an interpreter. The instructions configure the interpreter to evaluate an input set from a protocol development user interface against a known objects library, a protocol library, and declared objects. The instructions configure the interpreter to evaluate correlation of the input controls, the environment objects, and the object movement against the known objects library, the protocol library, and the declared objects. The instructions configure the interpreter to generate programmatic instructions. The instructions configure the apparatus to store the programmatic instructions as an instruction set within a protocol repository. The instructions configure the apparatus to transform the instruction set into executable commands through operation of a compiler. The instructions configure the apparatus to configure control logic to perform the executable commands in response to receiving detected environment objects and detected object movement from the image processor. The instructions configure the apparatus to operate an audio device in response to at least one executed command performed by the control logic. The instructions configure the apparatus to operate a constructor to generate an augmented reality layer in response to the at least one executed command performed by the control logic. The instructions configure the apparatus to overlay the augmented reality layer over an environment image layer through operation of a combiner. The instructions configure the apparatus to display the augmented reality layer above the environment image layer in a display device.

In some configurations, the instructions configure the apparatus to correlate the environment image layer and the augmented reality layer of an in progress instruction set to an edit control through operation of the correlator. The instructions configure the apparatus to operate the interpreter. The instructions configure the interpreter to evaluate correlation of the edit control, the environment image layer, and the augmented reality layer against the known objects library, the protocol library, the declared objects, and stored programmatic instructions for the in progress instruction set. The instructions configure the interpreter to generate revised programmatic instructions. The instructions configure the apparatus to store the revised programmatic instructions as a revised instruction set within the protocol repository. The instructions configure the apparatus to transform the instruction set into the executable commands through operation of the compiler. The instructions configure the apparatus to configure the control logic to perform the executable commands in response to receiving the detected environment objects and the detected object movement from the image processor. The instructions configure the apparatus to operate the audio device in response to the at least one executed command performed by the control logic. The instructions configure the apparatus to operate the constructor to generate a revised augmented reality layer in response to the at least one executed command performed by the control logic. The instructions configure the apparatus to overlay the revised augmented reality layer over the environment image layer through operation of the combiner. The instructions configure the apparatus to display the revised augmented reality layer above the environment image layer in the display device.

In some configurations, the image processor comprises an object recognition engine and a spatiotemporal activity engine. The object recognition engine and the spatiotemporal activity engine utilizes at least one neural network for detecting and classify the environment objects and tracking the object movement.

In some configurations, the protocol development user interface generates a flow diagram.

In some configurations, the protocol development user interface generates a three dimensional protocol workflow.

A non-transitory computer-readable storage medium, the computer-readable storage medium including instructions that when executed by a computer, cause the computer to correlate environment objects and object movement detected through an image processor to input controls through operation of a correlator. The instructions cause the computer to operate an interpreter. The instructions cause the interpreter to evaluate an input set from a protocol development user interface against a known objects library, a protocol library, and declared objects. The instructions cause the interpreter to evaluate correlation of the input controls, the environment objects, and the object movement against the known objects library, the protocol library, and the declared objects. The instructions cause the interpreter to generate programmatic instructions. The instructions cause the computer to store the programmatic instructions as an instruction set within a protocol repository. The instructions cause the computer to transform the instruction set into executable commands through operation of a compiler. The instructions cause the computer to configure control logic to perform the executable commands in response to receiving detected environment objects and detected object movement from the image processor. The instructions cause the computer to operate an audio device in response to at least one executed command performed by the control logic. The instructions cause the computer to operate a constructor to generate an augmented reality layer in response to the at least one executed command performed by the control logic. The instructions cause the computer to overlay the augmented reality layer over an environment image layer through operation of a combiner. The instructions cause the computer to display the augmented reality layer above the environment image layer in a display device.

The computer-readable storage medium further include instructions to correlate the environment image layer and the augmented reality layer of an in progress instruction set to an edit control through operation of the correlator. The instructions cause the computer to operate the interpreter. The instructions cause the interpreter to evaluate correlation of the edit control, the environment image layer, and the augmented reality layer against the known objects library, the protocol library, the declared objects, and stored programmatic instructions for the in progress instruction set. The instructions cause the interpreter to generate revised programmatic instructions. The instructions cause the computer to store the revised programmatic instructions as a revised instruction set within the protocol repository. The instructions cause the computer to transform the instruction set into the executable commands through operation of the compiler. The instructions cause the computer to configure the control logic to perform the executable commands in response to receiving the detected environment objects and the detected object movement from the image processor. The instructions cause the computer to operate the audio device in response to the at least one executed command performed by the control logic. The instructions cause the computer to operate the constructor to generate a revised augmented reality layer in response to the at least one executed command performed by the control logic. The instructions cause the computer to overlay the revised augmented reality layer over the environment image layer through operation of the combiner. The instructions cause the computer to display the revised augmented reality layer above the environment image layer in the display device.

In some configurations, the image processor comprises an object recognition engine and a spatiotemporal activity engine.

In some configurations, the object recognition engine and the spatiotemporal activity engine utilizes at least one neural network for detecting and classify the environment objects and tracking the object movement.

In some configurations, the protocol development user interface generates a flow diagram.

In some configurations, the protocol development user interface generates a three dimensional protocol workflow.

The systems disclosed herein have high utility for facilitating work, sometimes called procedural work, that involves the use of the operator's hands, that some measure of guidance delivered by the functions of the AR device that guides the user through the steps of a procedure to which the user adheres rigidly or loosely, and use of the additional functions of the AR device to retrieve relevant information from repositories and the immediate environment and deposit it together with new information in appropriate digital repositories.

Embodiments of a procedural language system enable the creation of content for an augmented reality device and enable a user to establish associations with viewed objects and object movements to form instructions for controlling and generating interactive content for use with the augmented reality devices.

The system includes an object recognition engine to recognize the object in an environment. The object recognition engine is able to recognize objects by referencing a visual database to match/identify the observed objects. The system may additionally allow a user to declare the identity of the object within the database to enable future recognition of the object. The ability to declare the identity of the object may rely on additional input sources that may include audio sensors or touch inputs. These additional input sources may provide the user with the ability to assign a recognized term to a detected object in the physical space.

The system may utilize the additional input sources to declare variables as part of the procedural language. The declaration of variables allows for the binding of associations with a physical action or visual object within the field of view.

The procedural language and content generation system may utilize a Turing-complete language or a Turing-incomplete language (e.g., markup languages) for generating a control scheme for directing a user through a guided process and/or creating AR guided content in through the AR content generation system. The procedural language may be written/developed in a protocol development user interface and communicated to an interpreter as an input set. The interpreter may identify object declarations, primitives, commands, and combinations thereof to generate an instruction set utilized to control AR device functionality. This functionality may include guiding a user through procedures in a protocol or managing configuration of the interpreter of correlated inputs of detected objects, object movement, and input controls (e.g., control signals, user inputs, etc.,)

The system may provide the ability to define segmentation (e.g., objects, movement of objects, transformation of object, etc.,) within a process. Segmentation may be facilitated while an object is in motion.

The system may have an assumption of spatial persistence allowing for "voice instructions" to tell user where the object is and where to declare it. This may be viewed as a persistence scope to define the scope of the variable, in order to allow the system to profile the area and knows where the object are and both remember and declare a new things. For example, the system may recognize an object while it is in view of the imaging device and map the object to a spatial location within the environment. When the object is out of view of the imaging device, the system may display visual indicators to direct the user back to the object within the environment.

The process of building associations may utilize contextual information required to identify the identification of objects in another environment. For instance, if a user is performing a laboratory procedure with known objects required to perform the procedure, the system may guide the user to bring certain objects in to their view for other steps in the process.

The procedural language may include control variables such as 'for loops' to repeat steps in a process.

The system may utilize a domain specific language that is device and system agnostic. The procedural language may create sets of linked list and collection of lists in a memory structure. The creation of the list may be configured with a dependency to collect the information and then perform a command. The procedural language may allow for the declaration of arrays, collections and do loops with control variables to limit the array. The procedural language may allow for the declaration of arrays and their collection with the possible use of a control variable to define the limits of same. The procedural language may allow for the declaration of collections by the user in an environment. The user may name (or "declare") the object, whose properties are then retrieved from a database to determine whether the object is a part of a collection or a set of many constituent parts.

Upon determining that an object is part of a larger collection, the system may perform actions, that include, but are not limited to, counting and individually labeling the parts of the set, guiding the user to individually label individual parts of the set, etc.

The procedural language system may provide a control structure for defining steps. The system may allow for the repetition or skipping steps in an ordered process by using a 'next' and/or 'previous' command provided by the user operating the AR device. Although, commands such as 'next' and 'previous' may be set as primary commands, the system may include capabilities to understand other basic commands with a greater degree of complexity. The actions performed by these defined commands may be restricted to the context or workspace the process is occurring in, in order to avoid confusion as well as a degree of specificity. These commands may be altered or modified similar to language libraries utilized by other programming languages.

The system may interact with augmented reality (AR) devices in manners that assist with work, including:

a) Guidance through the steps of an ordered process via visual or other sensory cues (which in turn include: i.) providing visual or other cues for the next operation or object with which the worker should engage, ii.) forestalling imminent errors, if the user is poised to execute an incorrect or out-of-sequence operation or make operational contact with an incorrect object iii.) allowing instant replay of FoV to catch very recent errors iv.) gating the user's activities so that she cannot take a step until a previous step is completed.

b) Retrieval of key data from laboratory instruments and other repositories and its display via audio or in the user's field of view (FOV).

c) Ability to record key observations in appropriate digital repositories.

This view of laboratory and other "procedural" operations (for example in the kitchen or at the construction site) is schematized in FIG. 1.

Many of the features of the system are directed towards providing guidance. In other aspects, the system relates to other means that AR devices may support laboratory and related operations.

In an embodiment AR support of a laboratory protocol overlays the next object to be manipulated in the visual field with a pulsing colored dot or other graphical or alphanumeric overlay, and indicates imminent contact or proximity by the user or a device held in her hand (eg the tip of a pipet) with an incorrect or out-of-sequence object by a flashing red dot or other overlay and/or an audible warning. The people who implement (i.e., code) this protocol in the AR device have at their disposal means to position the colored dot at a given location and/or at a given spot on a recognized object, whose location may have moved within the user's FoV, based on knowledge of the location of the object in the environment, the position of the user's head, and the direction the user's head (or, soon, gaze) is pointing. They then may use this information to cause the AR device to project a colored dot in the appropriate place in the user's FoV. This and like actions represent possible means of encoding procedural guidance for display and presentation by AR devices.

A problem with current means for implementing protocol guidance such as the above that it does not operate at a high enough level of abstraction. Actual laboratory protocols (and related protocols, such as recipes) are in fact detailed at a higher level of abstraction, typically written in natural language in second person imperative (e.g., "Take a test tube rack. Take 6 test tubes. Place them in separate holes in that rack. Using a marker, number the tubes 1-6. Remove the cap from Tube 1, then pipet into it 5 mL of solution A. Replace the cap. Repeat these steps for Tube 2, and for all the other tubes in the line of tubes . . . ).

The system provides a number of informatic (computational) means, at a higher level of abstraction, to program AR devices to provide procedural guidance and other kinds of support for laboratory actions.

In a high level view, the system uses a controlled vocabulary language to "encode" the sequence of steps the user of the AR device is to follow. These actions then are translated into code that directly runs the device, or into some intermediate language (such as byteencode) that the device may interpret. This results in device identifying an object within the environment to be utilized during the current stage of a process. For example, the current stage of a process indicates that a user should vortex a tube, as a result, the AR device places a colored dot on the tube to be vortexed during this stage. As another example, a user may want to check the status of a process, and the device asks if or what she wants to check. At the same time, the system uses this vocabulary to enable the user of the AR device to interact with and record the procedure.

In describing this language, "nouns" and "verbs" provided by a user may be interpreted as "objects" for "nouns" and "operations" and "conditionals" for "verbs".

Nouns used by a user to describe things in an environment may be utilized by the system to establish as an 'object' in a programming language. These things, the nouns, may be entities found in the lab/workspace, and, in the specific instance of the software used by an individual user, represent objects and substances known to be present in the lab/workspace. These objects may be known due to recognition by the software in the AR device (Known Objects and, possibly Known Substances), or they may be known because the user has declared them.

Declared objects and Declared Substances are a set of parameters that the system does not detect as a Known Object relative to the current context of the procedure or instructions that are being created. Declared objects all have implicit (and maybe explicit) prefixes such as "this" or "this here" and may be declared by pointing or holding while declaring.

The system refers to specific classes and individual Known Objects, Known Substances, declared objects, and Declared Substances as Named Objects and Named Substances.

Examples of Named Objects and Named Substances include:

Flask
Tubes 1-12
6 [six] petri plates
This pipet tip rack
Flasks
Culture tubes
96 well plates
Petri plates
Racks of pipet tips
Pipette
Larger volume pipetting devices
Vortexers The system also enables declaration of different types of files (e.g., microscope images, DNA Sequences) which, by implication have some relationship to the names of the information sources or information repositories that may house data of each type resulting from performance of this protocol.

The system may provide a method for declaring information sources and information repositories. The system also allow declaration of information sources, both local (e.g. microscope) and general (e.g. FIG. 5a, McCluskey et al., Cell, 2016).

In order to build a set of instructions to be carried out with the known objects and known substances, the procedural language utilizes 'primitives' to describe actions and/or a sequence of actions to associate with an operation specific to labs or to other workspaces (eg. kitchens, construction sites). These actions may be detected through audio inputs (e.g., use of defined verbs) or detected through the movement of the objects.

In a laboratory context, lab specific operations may include commands such as:

"Weigh Out" [named substance] [how much]
"Pipet" [named substance or contents of named tube] [how much] to or into [named object]
"Set out" [how many] [named objects or object classes]
"Label" [by hand/by generating QR code/by affixing RFID]
"Add To" [how much] [named substance or contents of named object] to [named object]
"Mix/Mix Together" [how much] [substance or contents of named tube]

These primitives may be utilized to describe operations performed by a user, or as part of a procedure a user is performing. Additionally, these primitives may include prepositions or other allowed qualifiers. These primitives may include shortcuts and subroutines generated by the user and synonyms for existing primitives specified by the user.

The system provides functionality to declare objects. Declarations may take the form "declare [object, object class, substance class][name associated with entity held in dominant hand or pointed to by touching with dominant hand index finger]." If object cannot be recognized by machine vision because it is partly occluded, the system will recognize that the object is an object that is no longer where it was in the FoV (because it's been moved by a user's hand).

The system may also recognize the object after it has been returned to its position of origin (position on the bench or within a rack).

The system may allow for the retrieval of information such as a Protocol Check or an Inventory Check [named protocol]. (This asks: are the materials and reagents present to perform this procedure?)

Other key commands for the system in laboratory applications may include the following terms as well as terms that the that the operator or content generator defines as synonyms. These terms include:

"Lablight or Light or Light Up" [named object or gazed-at object] or [declared variable]. (causes named object or variable to display internet of things (IoT) styled information about itself in the FOV)
"Lablight Paper Trail or "Paper Trail" [possible modifiers]. [starts giving historical data, vendor specific lot number about Named Objects or Named Substances]
"Lablight Diagnose or "Diagnose" [Named Object]". [Initiates troubleshooting on Named Object if relevant]
"Record" (Ree·cord) [no time period specified]. [start video and audio recording now]
"Record last (Ree·cord last" [time period]. start saving recording including previous time period up to one minute.
"Save last/save previous" [time period].
"Photograph (take a still picture of FOV)"
"Retrieve" (ree·treeve) [specified kind of data from named or gazed-at object]
"Move window . . . (i.e., within FOV) [up] [down] [left] [right] [closer] [farther away]"
"Fix window . . . [on] [above] [on side of] [on surface of]" physical object The system may provide the ability to store recorded information through certain commands such as 'File' or 'File To' (store last data retrieved in named repository).

The system may allow for the identification of some additional verbs for the user utilize that are not particularly specific to lab. These verbs may include:

"Call, IM" (Eye·Emm) (India Mike, eg, instant message), Conference call [name of person](during call)
"Show my FOV"
"Hide my FOV"
"Help" or "Show help menu".

The system may provide identification of verbs specific to a lab that are critical, and not operated by the user. These verbs may include:

"Define Location." A given volume of space defined with respect to a known or declared object]
"Set Attention Dot or Put Attention Dot (green) [location]" Lights up location
"Set Attention Dot or Put Attention Dot (pulsing green)." Lights up location you need to attend next if you have finished previous step and/or you have dawdled more than 30 sec
"Set Attention Dot or Put Attention Dot (red)." Lights up location when some part of you (hands) or hand extension (pipet tip) overlaps an object you are not to touch next.
"Place Attention Beep". (eg. beep beep beep). Sound vector makes it come from place in field of hearing occupied by object not to be touched.
"Activate Audible Warning" (e.g., beep beep beep) As above, sound vector makes it come from object not to be touched.
"Activate Audible Query" (eg. questioning sounds similar to those made by R2-D2 in the movie "Star Wars"). This may be "what is this object" and do you really mean to do this?
"Log Action initiated." Timing starts when user hand enters the volume near a colored overlay (eg, dot).
"Log Action completed/Dot completed." Turns off overlay/dot when hands or hand extension (eg Pipet tip) moves away from formerly dotted location.
"Run [clip]." Opens window and runs video segment illustrating some aspect of procedure]
"Display [text]." Opens window to show text that, for example, gives written instructions for completing some step of the procedure]
"Display [image]." Opens window to show image as above.
"Read out [text]." Reads text out as words.

The procedural language system may allow definable "subroutines", e.g. "Weigh out 100 g of [Sodium Chloride]" rather than requiring the programmer/author to break that command down more finely into individual commands.

In this language, only possible/permissible commands are syntactically and semantically correct. For example, a command to vortex a lab stool describes a nonsensical operation and is therefore a syntax error. In some circumstances the system might call on a second system (e.g., an Augmented Reality Physical Properties engine, see U.S. Ser. No. 15/374,971) to query if a given command makes sense ("e.g., place 100 g of salt into a beaker, place the beaker over a Bunsen burner and heat until the salt boils") is not permitted.

In addition to using the rules of the language to describe permissible and impermissible commands, the system might call on another system, (e.g., the Augmented Reality Physical Properties Engine, see U.S. Ser. No. 15/374,971 above), to see if a given string of verbs and nouns was permitted.

In addition to the above kinds of impermissible commands, the language also recognizes commands that are physically impossible, such as superimposing two solid physical objects in the same volume of space.

The system may refer to a set of procedural commands as a "program" or "script".

A major use of this controlled vocabulary and standardized syntax is to allow the user of the AR device to interact with the procedure they are following and document it (as described in a related system, Augmented Reality Procedural system, see Augmented Reality Procedural system, see U.S. Ser. No. 15/374,920).

The system may recognize big objects (water baths) and smaller objects (tubes). The system may recognize the large objects and/or the user may declare them at the start of a procedure. The system may be configured to only recognize individual tubes by their place within a rack.

Our most important high level command is "put that colored dot" or otherwise "place that visual attention marker" "on something", which may have moved in the visual field.

If the angular resolution of the depth sensing part of the AR device or other components of spatial resolution in three dimensions is not adequate to place dot accurately in three dimensions, the system may place it at the correct place in the two-dimensional image being displayed in the user's dominant eye.

Another important high level command is "put that red dot" or "red X" or "place that warning marker" on something, where the something may include a tube, or the end of the pipetting device, or a static object in the visual field. This is often accompanied by "place that attention beep" in that position in the user's Field of Hearing (FoH). The default when the user is about to touch a non-green-dot tube or object at the end of the user's dominant hand.

A key aspect of these high level commands is that the programmer may specify "next tube" or "next object" or "go to next tube or next object" and the software may translate that next step in the procedure into placement of the dot or a beep onto the position of the next tube and the next object in the FoV/FoH.

A key part of normal code in this Augmented Reality Programming Language is that attempt to touch or withdraw from its position in the rack a non-green-dot tube or an out-of-sequence object may cause the program to emit an warning message (red light, red X, beep beep beep) or a query message (flashing question mark or yellow light, together with query tone—for example, the tone made by R2-D2).

Consider the above in light of this sample code.
Put colored dot on tube i
  Do j=1,3
    Put colored dot on Water
      Tell user to pipet 100 ul water (or whatever)
      Put colored dot on tube i
      Put colored dot on 10× buffer
      Tell user to pipet 11 ul 10× buffer
      Put colored dot on Tube i
      Put colored dot on HinDIII restriction enzyme
      Tell user to pipet 1 ul HinDIII
      Put colored dot on Tube i
    End Do
  End Do
  Do i=1,12
    Put colored dot on tube i
    Tell user to flick tube.
End Do The system may utilize a content authoring environment/content generation environment to generate a set of instructions for controlling the augmented reality device. The content authoring environment/content generation environment comprises a user interface that has a number of pre-programmed elements that support the development of procedural and other laboratory-relevant "content" for AR devices. The "authoring environment" is a program in which the support elements are built in, with UI controls such as buttons, drop down menus, moving boxes. Authoring environments generally enable interactions with a GUI and other UI entities, rather than by using a command line. The purpose of the environment is to ensure that the content's author does not need to know how to use a command line interface to write what is in effect a program.

The procedural content authoring environment may be particularly crafted to enable creation of procedural content, and in particular procedural content that supports laboratory and related operations.

Examples of particularly important functions utilized in this environment include:

a) facilitating the ability of researchers and other authors to instantiate or embody elements of procedures they have imagined into code that may allow an AR device to support performance of the procedure.

b) facilitating the ability of researchers and other authors to instantiate or embody elements of procedures they have developed into code that allows other researchers to replicate the procedure.

c) facilitating the ability of researchers to embody in code modifications to already-encoded procedures.

d) facilitating the ability of a researcher or other author acting as a "director" to take procedures depicted in "old media" such as graphics or text or video, and working from these, adapt them into AR "content", a Procedural Language "script" that "runs" the procedure on an AR device.

e) facilitating the ability of an researcher or author performing as an "actor" to "star" in a "recording" of procedure they are carrying out, which, together with appropriate commands from the "actor" or an outside "director", is then edited and converted into AR "content", a Procedural Language "script" that provides others with guidance in carrying out the procedure.

In this context, the system assigns particular importance to the uses of the controlled vocabulary and controlled syntax procedural language portions of this system in order to articulate such commands.

The system builds the Content Generation Environment (CGE) using ideas about programming tools and elements that predate AR. For example, the CGE may include an "asset browser" (e.g., file explorer, media browser, gallery, etc.,), which may allow the author to identify files (e.g., text, graphics, video clips) that they wish to include in the AR content, and means to arrange these elements along with commands equivalent to those from the procedural language into "sequences" that may "play" as the user steps through a procedure.

Significantly, as in the command line language, the Content Generation Environment does not allow nonsensical or physically impossible commands, such as vortexing Bunsen burners or superimposing two solid objects in the same volume of space.

"Authoring" in the CGE may be accessed by projected visual and audio UIs operated by authors using AR devices.

The CGE parses program text and attaches semantic properties to the structure. The attached information includes information about symbol tables such as information about the definition and use of variables and procedures and information about types. The CGE includes browsers and other tools that make this information available, and allow the user to navigate through the whole set or subset of program objects to make queries about the objects and their relationships. By so doing, the browser and other tools helps the user understand the status and structure of code under development.

The system may provide support for multiple developers and complex projects. The CGE embodies a means to control and manage development of multiple versions of software modules by multiple users. These means allow rigorous version control and configuration management. The CGE allows the user to define a blueprint—that is, a system model that describes the modules that make up the program. Given the model, the environment maintains a history of the user's selection of various versions in forming a program. The environment may also determine when a module needs to be recompiled to maintain consistency among them. The CGE may limit construction and maintenance of content by multiple programmers to specific subsystems/specific groups of modules. It may enforce check in/check out procedures and control access to program components so as to that prevent developers from overwriting one another' code. In another embodiment, a community of users may be able to generate modifications to the content while the content is be run in a procedure that may be combined with the original content or stored as a new version.

The procedural language may be language run by an interpreter. In some adaptations of the systems, other programming languages may be compiled into the procedural language. These languages may be accomplished by a markup language and a markup language with dependency automation (this could be thought of as being part of a functional programming paradigm). Here is an example of a series of steps for a simple markup language: A series of steps, written as:{Step name, Text Instruction, [Objects to draw green circles on], [Array of pairs Objects to draw arrows from and to]}. This series of steps could be encoded in XML using tags, JSON using a list of dictionaries, YAML, or any other appropriate method. Here is an example of a series of steps in a markup language that encodes the dependencies for each step.{Step: Step5 Instruction: attach object A to object dependencies: Step1, Step3, Step2}. In this way, the system could build a dependency tree for all steps, and generate all possible procedural paths. This would allow the user to dynamically switch between paths while going through the procedure if one step was temporarily blocked or waiting on something. Additionally, an integrated development environment (IDE) could be adapted to operate with other languages.

The system may utilize an IDE that includes built-in compilation, simulation, and/or debugging environments. The system may provide functionality to detect errors in spoken commands based on a semantic understanding of the process/procedure being performed. The system may incorporate existing error recognition process to determine syntax errors commonly used in typing systems. These systems include: "Duck Typing" in which the system cannot perform an operation on an object if that object lacks a given property, Class typing, which incorporates a standard object-oriented programming class-based typing approach, and Template specialization, where an operation can/cannot be performed on a superclass of objects. The system may provide functionality to record generalized audit trails/macros which may also be later run as device input to guide a future user. The system may incorporate functionality associated with "Object Oriented Programming Languages" (OOPL), since AR systems permits/allows a 1-to-1 correspondence between physical objects to objects as those are understood in an OOPL.

The system may include OOPL functionality found in Turing-complete languages, Turing-incomplete languages (e.g., markup languages), command lines, GUIs, etc.). The content generation environment may allow procedural code for lab and related procedures to be written in an OOPL in which physical objects belong to classes and framing ways the objects may interact with one another during a procedure as the interactions would be limited by the properties of objects in those classes.

The system may generate finite state machines for controlling devices. A finite state machine (sometimes called a finite state automaton) is a computation model that can be implemented with hardware or software and can be used to simulate sequential logic and some computer programs. Finite state automata generate regular languages. Finite state machines can be used to model problems in many fields including mathematics, artificial intelligence, games, and linguistics.

The system may allow for the ability to write code procedures in the CGE by manipulating objects in a 3D environment due to the aforementioned 1-to-1 correspondence objects and their properties. For example, pulling plastic tubes out of a bag and placing them into holes in a tube rack.

Additionally, the system may allow generation of an instructions set from an image of a written process. The written process may be written in an existing programming language that includes a Turing complete or Turing incomplete computer programming language or written out as pseudocode description of the process. Furthermore, the written process may be a set of instructions such as a procedure or protocol.

One of skill in the art will realize that the methods and apparatuses of this disclosure describe prescribed functionality associated with a specific, structured graphical interface. Specifically, the methods and apparatuses, inter alia, are directed to a procedural language content generation system utilizing a combination of inputs from an augmented reality device and user input devices to generate user guiding augmented reality content. One of skill in the art will realize that these methods are significantly more than abstract data collection and manipulation.

Further, the methods provide a technological solution to a technological problem, and do not merely state the outcome or results of the solution. As an example, the system combines user inputs and environment inputs to generate augmented reality content without relying on a user's knowledge of coding computer software. This is a particular technological solution producing a technological and tangible result. The methods are directed to a specific technique that improves the relevant technology and are not merely a result or effect.

Additionally, the methods produce the useful, concrete, and tangible result of an instruction set that generates augmented reality content in response to detected objects in an environment image.

Further, the methods are directed to a specifically-structured graphical user interface, where the structure is coupled to specific functionality. More specifically, the methods disclose a user interface that combines user inputs and commands with environment images to generate and store instructions for controlling an augmented reality device, rather than using conventional user interface methods to write and store hardware and software instructions.

Referencing FIG. 1, the procedural language and content generation system 100 comprises an image sensor 102, an environment image 104 environment objects 136 comprising environment objects 136, an image processor 110 comprising an object recognition engine 130 and a spatiotemporal activity engine 120, an audio sensor 106, an input device 114, a correlator 122, a protocol development user interface 140, an interpreter 124, a protocol library 108, a known objects library 112, declared objects 138, a protocol repository 142 comprising an instruction set 116, a compiler 118, control logic 146, a constructor 144, a combiner 148, an audio device 132, and a display device 126 comprising an environment image layer 128 and an augmented reality layer 134.

The image sensor 102 captures an environment image 104 that includes environment objects 136. The environment image 104 represents a workspace being utilized by an operator of the procedural language and content generation system 100 to generate a guided process or record of a process. The environment image 104 is communicated to an image processor 110. The image processor 110 includes an object recognition engine 130 and a spatiotemporal activity engine 120. The object recognition engine 130 detects environment objects 136 within the environment image 104. The spatiotemporal activity engine 120 tracks movement and position of detected environment objects within the workspace of the environment. The image processor 110 communicates detected environment objects and detected object movement to a correlator 122.

The correlator 122 correlates the detected object movement and the detected environment objects from the image processor 110 to secondary inputs from sources that include, but are not limited to an audio sensor 106 and an input device 114. The correlator 122 communicates the correlation of the detected object movement and the detected environment objects to the interpreter 124. The interpreter 124 transforms detected physical objects and movements of the detected physical objects into programmatic instruction. The interpreter 124 evaluates the correlations against protocols in the protocol library 108, known objects in the known objects library 112, and declared objects 138, to generate programmatic instruction for controlling and operating an augmented reality device.

The interpreter 124 additionally communicates with a protocol development user interface 140. The protocol development user interface 140 communicates input controls that are evaluated against protocols in the protocol library 108, known objects in the known objects library 112, and declared objects 138, to generate programmatic instruction 150 for controlling and operating an augmented reality device.

The interpreter 124 stores the programmatic instruction in a protocol repository 142 as part of an instruction set 116. The instruction set 116 is communicated to a compiler 118. The compiler 118 transforms the programmatic instruction into machine readable instructions for controlling the procedural language and content generation system 100 in the form of executable commands. The executable commands are utilized to configure control logic 146. The executable commands are performed by the control logic 146 in response to the detected environment objects 136 and the detected object movements provided by the image processor 110. The executable commands operate an audio device 132 of the procedural language and content generation system 100. The executable commands operate a constructor 144 to generate an augmented reality layer 134. The augmented reality layer 134 is communicated to a combiner 148. The combiner 148 receives the environment image 104 from the spatiotemporal activity engine 120 combines the environment image 104 with the augmented reality layer 134. The combined image is then displayed in a display device 126 with the augmented reality layer 134 overlaid above the environment image layer 128.

Figure 4:
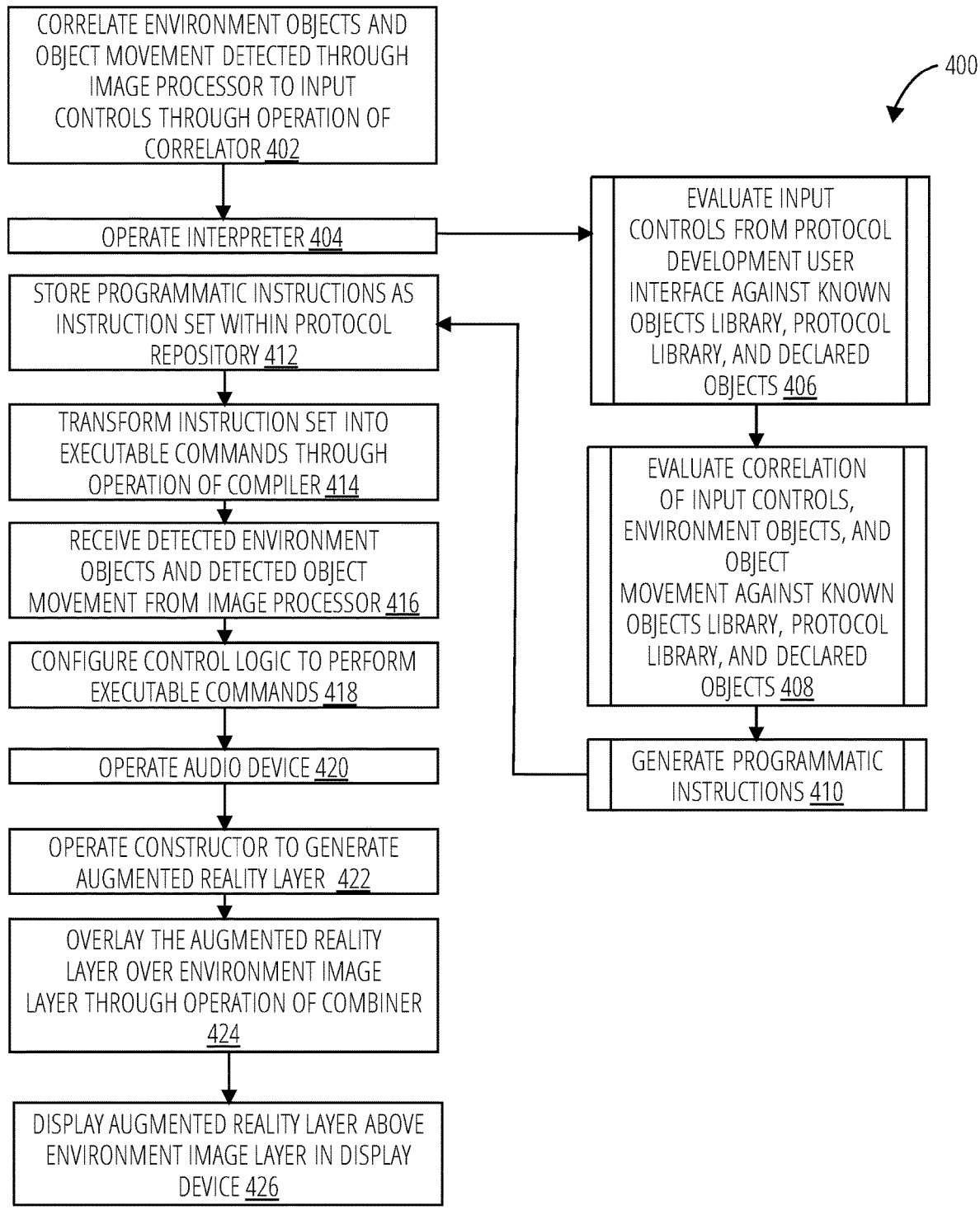
FIG. 4 illustrates a method 400 for operating a procedural language and content generation system in accordance with one embodiment.

The procedural language and content generation system 100 may be operated in accordance with the process described in FIG. 4.

Another embodiment of a procedural language and content generation system comprising an image sensor 102, an environment image 104 comprising environment objects 136, an image processor 110 comprising an object recognition engine 130 and a spatiotemporal activity engine 120, an audio sensor 106, an input device 114, a correlator 122, a protocol development user interface 140, an interpreter 124, a protocol library 108, a known objects library 112, a declared objects 138, a protocol repository 142 comprising an instruction set 116, a compiler 118, control logic 146, a constructor 144, a combiner 148, an audio device 132, and a display device 126 comprising an environment image layer 128 and an augmented reality layer 134.

In the procedural language and content generation system, a user may decide to edit the augmented reality content generated in the procedural language and content generation system 100 while the content is being displayed through the display device 126 and in conjunction with the content captured by the image sensor 102. During playback of the AR content (i.e., augmented reality layer 134 and environment image layer 128), a user may communicate an edit control through the audio sensor 106 and the input device 114 to the correlator 122. The edit control may indicate a modification to an interaction and/or information displayed in the augmented reality layer 134, relative to objects in the environment image layer 128 as it relates to the stored programmatic instructions. The edit control allows the interpreter 124 to generate a revised instruction set utilized to generate a revised augmented reality layer.

The interpreter 124 reevaluates the correlations against protocols in the protocol library 108, known objects in the known objects library 112, and declared objects 138, to generates revised programmatic instruction for controlling and operating the augmented reality device.

The interpreter 124 stores the revised programmatic instruction in a protocol repository 142 as part of a revised instruction set. The revised instruction set is communicated to the compiler 118. The compiler 118 transforms the revised programmatic instruction into machine readable instructions for controlling the procedural language and content generation system in the form of executable commands. The executable commands are utilized to configure control logic 146. The executable commands are performed by the control logic 146 in response to the detected environment objects and the detected object movements provided by the image processor 110. The executable commands operate an audio device 132 of the procedural language and content generation system. The executable commands operate a constructor 144 to generate an augmented reality layer. The augmented reality layer is communicated to a combiner 148. The combiner 148 receives the environment image 104 from the spatiotemporal activity engine 120 combines the environment image 104 with the revised augmented reality layer. The combined image is then displayed in a display device 126 with the revised augmented reality layer overlaid above the environment image layer 128.

The procedural language and content generation system may be operated in accordance with the process described further below.

Figure 2:
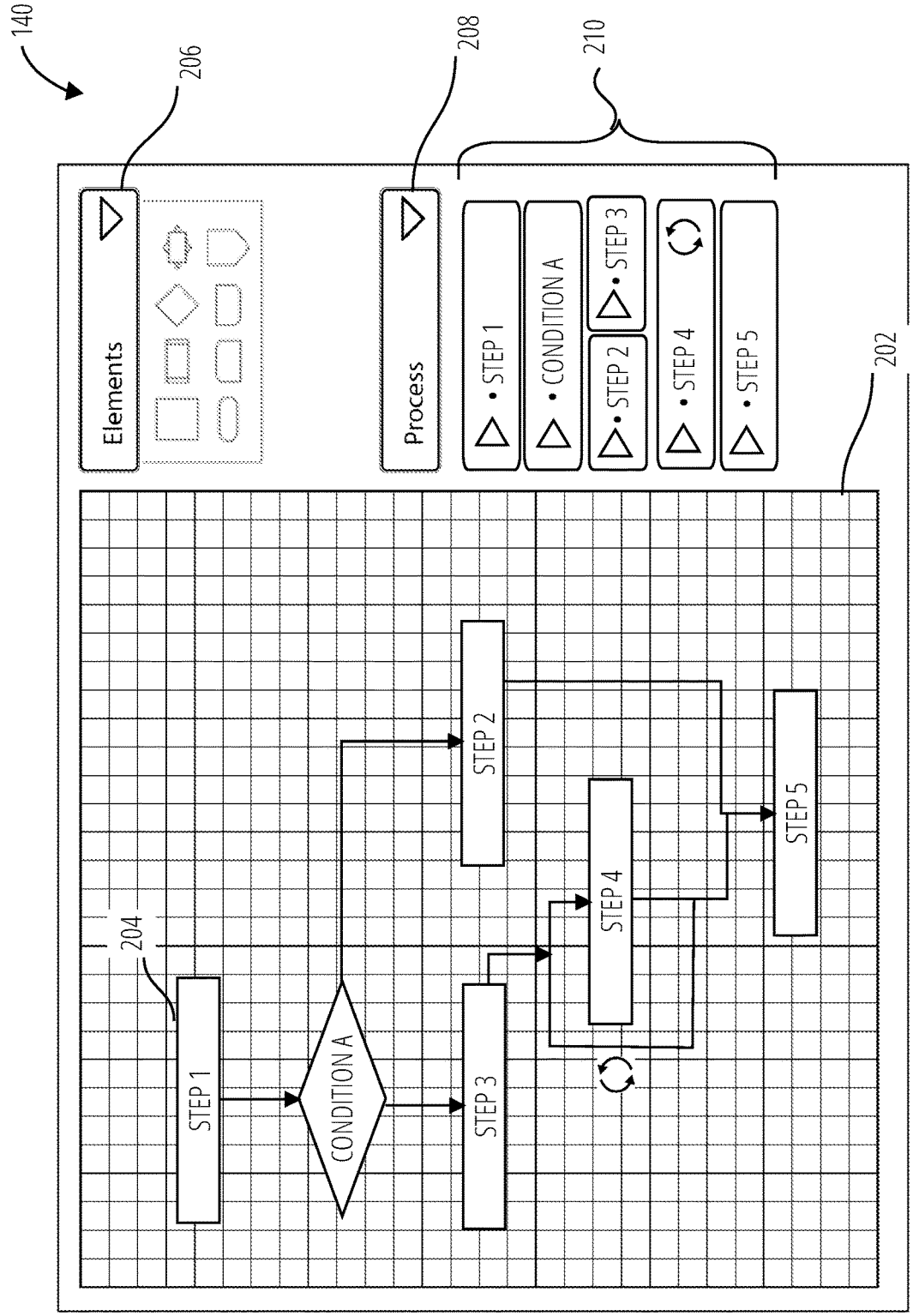
FIG. 2 illustrates a protocol development user interface 140 in accordance with one embodiment.

Referencing FIG. 2, a protocol development user interface 200200 may comprise a drawing canvas 202, a process step 204, a process element menu 206, a process outline 208, and process outline steps 210. In some configurations, a user may utilize a protocol development user interface 200 to generate procedural language content for an augmented reality system. The protocol development user interface 200 may allow user's to generate a flow diagram in a drawing canvas 202 illustrating different process step 204s of an outline process. The user may edit add additional process elements by selecting them from a process element menu 206. The process may be summarized in a process outline 208 for the user that may also allow the user to modify the process at high level by moving around individual process outline steps 210 in the process outline 208.

Figure 3:
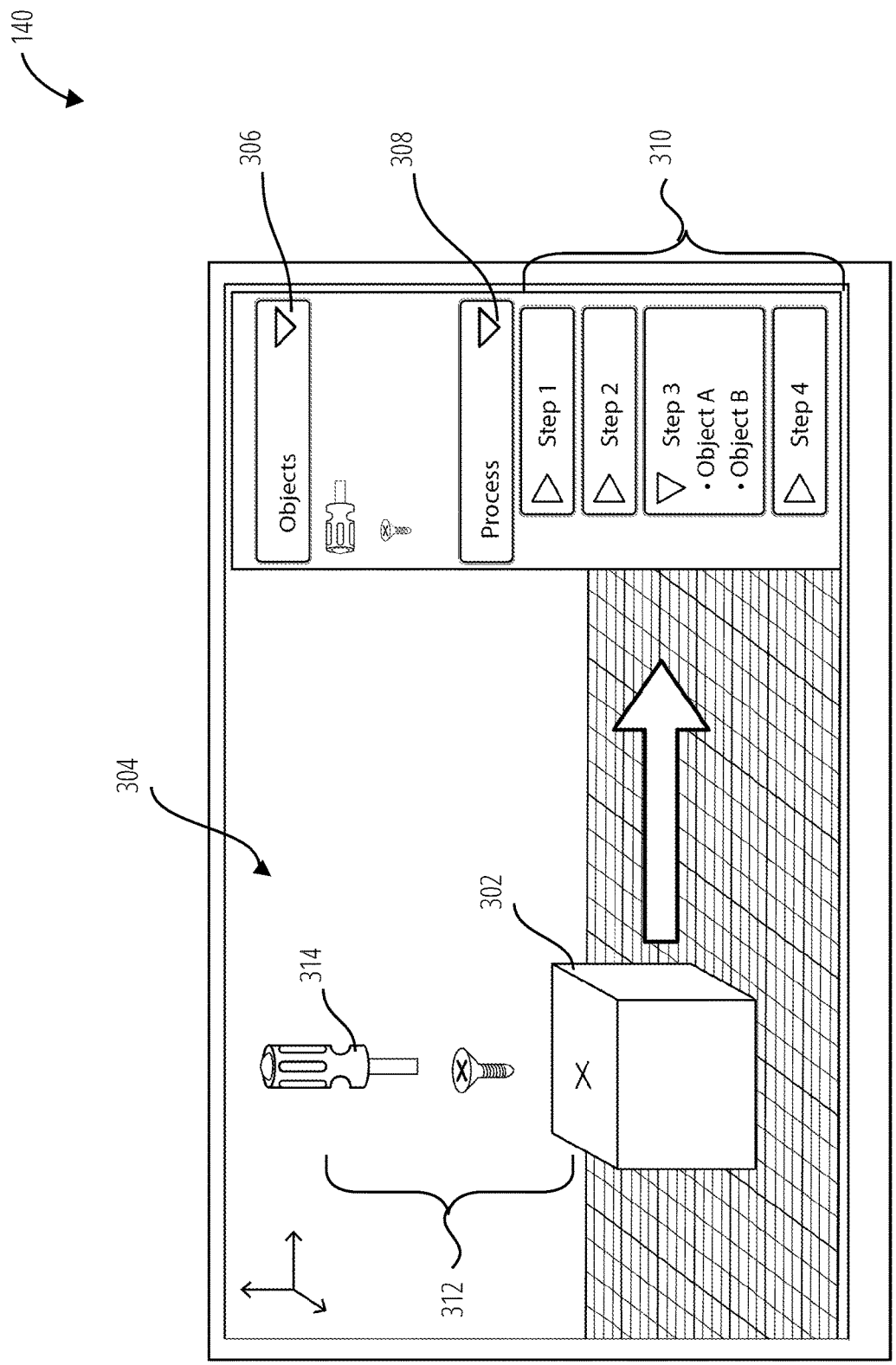
FIG. 3 illustrates a protocol development user interface 140 with a three dimensional protocol workflow in accordance with one embodiment.

Referencing FIG. 3, the protocol development user interface 140 comprise environment objects 302, a three dimensional environment 304, an environment objects menu 306, a process outline 308, process outline steps 310, a process step 312, and environment objects 314.

A 3D editor which displays a library of objects captured from the headset (or from a standard library).

Steps are created by selecting objects from the library (which have already been pre segmented).

The selected objects appear in a virtual 3D workspace.

Instructions can be added to each step and visual cues can and annotations can be drawn.

These annotations stay in place relative to the object (i.e. if the object is in a different spot when the instructions are played, they would stay in the same relative position to where they were drawn in the IDE) or objects (i.e. an arrow between two objects would still go between the two objects in any position).

Virtual hands could be placed in the workspace as a direction to users on how to hold or manipulate objects.

The above editors could be integrated to allow step editing (3D editor) and inter-step process flow editing.

The GUI-based editor could have an interactive code window which shows the generated markup language or procedural code as changes are being made in the flow-chart or 3D editors.

The GUI-based editor could also have an interactive visual dependency manager.

Referencing FIG. 4, a method 400 for operating a procedural language and content generation system involves operating a correlator to correlate environment objects and object movement detected through an image processor to input controls (block 402). In block 404, the method 400 operates an interpreter. In subroutine block 406, the correlator evaluates input controls from a protocol development user interface against a known objects library, a protocol library, and a declared objects. In subroutine block 408, the correlator evaluates correlation of the input controls, the environment objects, and the object movement against the known objects library, the protocol library, and the declared objects. In subroutine block 410, the correlator generate programmatic instructions. In block 412, the method 400 stores the programmatic instructions as an instruction set within a protocol repository. In block 414, the method 400 transforms the instruction set into executable commands through operation of a compiler. In block 416, the control logic receives detected environment objects and detected object movement from an image processor. In block 418, the method 400 configures the control logic to perform the executable commands. In block 420, the control logic operates an audio device. In block 422, the control logic operates a constructor to generate an augmented reality layer. In block 424, the method 400 overlays the augmented reality layer over an environment image layer through operation of a combiner. In block 426, the method 400 displays the augmented reality layer above the environment image layer in a display device.

The system correlates the environment image layer and the augmented reality layer of an in progress instruction set to an edit control through operation of the correlator and operates the interpreter. The system operates the interpreter to evaluate correlation of the edit control, the environment image layer, and the augmented reality layer against the known objects library, the protocol library, the declared objects, and stored programmatic instructions for the in progress instruction set. The system operates the interpreter to generate revised programmatic instructions. The system stores the revised programmatic instructions as a revised instruction set within the protocol repository. The system transforms the instruction set into the executable commands through operation of the compiler. The system configures the control logic to perform the executable commands in response to receiving the detected environment objects and the detected object movement from the image processor. The system operates the audio device in response to the at least one executed command performed by the control logic. The system operates the constructor to generate a revised augmented reality layer in response to the at least one executed command performed by the control logic. The system overlays the revised augmented reality layer over the environment image layer through operation of the combiner. The system displays the revised augmented reality layer above the environment image layer in the display device.

An exemplary convolutional neural network arranges its neurons in three dimensions (width, height, depth). Every layer of the convolutional neural network transforms a 3D volume of inputs to a 3D output volume of neuron activations. In this example, the input layer encodes the image, so its width and height would be the dimensions of the image, and the depth would be 3 (Red, Green, Blue channels). The convolutional layer further transforms the outputs of the input layer, and the output layer transforms the outputs of the convolutional layer into one or more classifications of the image content.

An exemplary convolutional neural network includes a subregion of the input layer region of an input layer region of an image that is analyzed by a set of convolutional layer subregion in the convolutional layer. The input layer region is 32×32 neurons long and wide (e.g., 32×32 pixels), and three neurons deep (e.g., three color channels per pixel). Each neuron in the convolutional layer is connected only to a local region in the input layer region spatially (in height and width), but to the full depth (i.e. all color channels if the input is an image). Note, there are multiple neurons (5 in this example) along the depth of the convolutional layer subregion that analyzes the subregion of the input layer region of the input layer region, in which each neuron of the convolutional layer subregion may receive inputs from every neuron of the subregion of the input layer region.

A popular form of a CNN is known as a VGG net. The initial convolution layer stores the raw image pixels and the final pooling layer determines the class scores. The VGG net includes intermediate convolution layers and rectifier activations and intermediate pooling layers along the processing path.

The VGG net replaces the large single-layer filters of basic CNNs with multiple 3×3 sized filters in series. With a given receptive field (the effective area size of input image on which output depends), multiple stacked smaller size filters may perform better at image feature classification than a single layer with a larger filter size, because multiple non-linear layers increase the depth of the network which enables it to learn more complex features. In a VGG net each pooling layer may be only 2×2.

Convolution layer filtering connects the outputs from groups of neurons in a convolution layer to neurons in a next layer. A receptive field is defined for the convolution layer, in this example sets of 5×5 neurons. The collective outputs of each neuron the receptive field are weighted and mapped to a single neuron in the next layer. This weighted mapping is referred to as the filter for the convolution layer (or sometimes referred to as the kernel of the convolution layer). The filter may actually be a cubic volume of neurons in the convolution layer, not a square. The filter is slid, or convolved, around the input image, each time mapping to a different neuron in the next layer. For example the filter may be stepped to the right by 1 unit (the "stride"), creating a slightly offset receptive field from the top one, and mapping its output to the next neuron in the next layer. The stride can be and often is other numbers besides one, with larger strides reducing the overlaps in the receptive fields, and hence further reducing the size of the next layer. Every unique receptive field in the convolution layer that can be defined in this stepwise manner maps to a different neuron in the next layer. Thus, if the convolution layer is 32×32×3 neurons per slice, the next layer need only be 28×28×1 neurons to cover all the receptive fields of the convolution layer. This is referred to as an activation map or feature map. There is thus a reduction in layer complexity from the filtering. There are 784 different ways that a 5×5 filter can uniquely fit on a 32×32 convolution layer, so the next layer need only be 28×28. The depth of the convolution layer 1002 is also reduced from 3 to 1 in the next layer.

The number of total layers to use in a CNN, the number of convolution layers, the filter sizes, and the values for strides at each layer are examples of "hyperparameters" of the CNN.

A pooling layer function with a 2×2 receptive field and a stride of two is an example of the Maxpool pooling technique. The outputs of all the neurons in a particular receptive field of the input layer are replaced by the maximum valued one of those outputs in the pooling layer. Other options for pooling layers are average pooling and L2-norm pooling. The reason to use a pooling layer is that once a specific feature is recognized in the original input volume (there will be a high activation value), its exact location is not as important as its relative location to the other features. Pooling layers can drastically reduce the spatial dimension of the input layer from that point forward in the neural network (the length and the width change but not the depth). This serves two main purposes. The first is that the amount of parameters or weights is greatly reduced thus lessening the computation cost. The second is that it will control overfitting. Overfitting refers to when a model is so tuned to the training examples that it is not able to generalize well when applied to live data sets.

When a single object is in an image, the classification model may be utilized to identify what is in the image. For instance, the classification model may identify that a cat is in the image. In addition to the classification model, a classification and localization model may be utilized to classify and identify the location of the cat within the image with a bounding box. When multiple objects are present within an image, an object detection model may be utilized. The object detection model utilizes bounding boxes to classify and locate the position of the different objects within the image. An instance segmentation model detects each object of an image, its localization and its precise segmentation by pixel with a segmentation region.

The Image classification models classify images into a single category, usually corresponding to the most salient object. Photos and videos are usually complex and contain multiple objects. This being said, assigning a label with image classification models may become tricky and uncertain. Object detection models are therefore more appropriate to identify multiple relevant objects in a single image. The second significant advantage of object detection models versus image classification ones is that localization of the objects may be provided.

Some of the model that may be utilized to perform image classification, object detection, and instance segmentation include but are not limited to, Region-based Convolutional Network (R-CNN), Fast Region-based Convolutional Network (Fast R-CNN), Faster Region-based Convolutional Network (Faster R-CNN), Region-based Fully Convolutional Network (R-FCN), You Only Look Once (YOLO), Single-Shot Detector (SSD), Neural Architecture Search Net (NASNet), and Mask Region-based Convolutional Network (Mask R-CNN).

These models may utilize a variety of training datasets that include but are not limited to PASCAL Visual Object Classification (PASCAL VOC) and Common Objects in COntext (COCO) datasets.

The PASCAL Visual Object Classification (PASCAL VOC) dataset is a well-known dataset for object detection, classification, segmentation of objects and so on. There are around 10 000 images for training and validation containing bounding boxes with objects. Although, the PASCAL VOC dataset contains only 20 categories, it is still considered as a reference dataset in the object detection problem.

ImageNet has released an object detection dataset since 2013 with bounding boxes. The training dataset is composed of around 500 000 images only for training and 200 categories.

The Common Objects in COntext (COCO) datasets were developed by Microsoft. This dataset is used for caption generation, object detection, key point detection and object segmentation. The COCO object detection consists in localizing the objects in an image with bounding boxes and categorizing each one of them between 80 categories.

In a Fast Region-based Convolutional Network (Fast R-CNN) the entire image feeds a CNN model to detect RoI on feature maps. Each region is separated using a RoI pooling layer and it feeds fully connected layers. This vector is used by a Softmax classifier to detect the object and by a bounding box linear regressors to modify the coordinates of the bounding box. The purpose of the Fast R-CNN is to reduce the time consumption related to the high number of models necessary to analyze all region proposals.

A main CNN with multiple convolutional layers is taking the entire image as input instead of using a CNN for each region proposals (R-CNN). Region of Interests (RoIs) are detected with the selective search method applied on the produced feature maps. Formally, the feature maps size is reduced using a RoI pooling layer to get valid Region of Interests with fixed height and width as hyperparameters. Each RoI layer feeds fully-connected layers creating a features vector. The vector is used to predict the observed object with a softmax classifier and to adapt bounding box localizations with a linear regressor.

In a Region-based Convolution Network (R-CNN) each region proposal feeds a convolutional neural network (CNN) to extract a features vector, possible objects are detected using multiple SVM classifiers and a linear regressor modifies the coordinates of the bounding box. The regions of interest of the input image. Each ROI of resized/warped creating the warped image region which are forwarded to the convolutional neural network where they are fed to the Support Vector Machines and bounding box linear regressors.

In R-CNN, the selective search method is an alternative to exhaustive search in an image to capture object location. It initializes small regions in an image and merges them with a hierarchical grouping. Thus the final group is a box containing the entire image. The detected regions are merged according to a variety of color spaces and similarity metrics. The output is a few number of region proposals which could contain an object by merging small regions.

The R-CNN model combines the selective search method to detect region proposals and deep learning to find out the object in these regions. Each region proposal is resized to match the input of a CNN from which the method extracts a 4096-dimension vector of features. The features vector is fed into multiple classifiers to produce probabilities to belong to each class. Each one of these classes has a Support Vector Machines (SVM) classifier trained to infer a probability to detect this object for a given vector of features. This vector also feeds a linear regressor to adapt the shapes of the bounding box for a region proposal and thus reduce localization errors.

The CNN model described is trained on the ImageNet dataset. It is fine-tuned using the region proposals corresponding to an IoU greater than 0.5 with the ground-truth boxes. Two versions are produced, one version is using the PASCAL VOC dataset and the other the ImageNet dataset with bounding boxes. The SVM classifiers are also trained for each class of each dataset.

Region proposals detected with the selective search method were still necessary in the previous model, which is computationally expensive. Region Proposal Network (RPN) was introduced to directly generate region proposals, predict bounding boxes and detect objects. The Faster R-CNN is a combination between the RPN and the Fast R-CNN model.

A CNN model takes as input the entire image and produces a feature map. A window of size 3×3 slides all the feature maps and outputs a features vector linked to two fully-connected layers, one for box-regression and one for box-classification. Multiple region proposals are predicted by the fully-connected layers. A maximum of k regions is fixed thus the output of the box regression layer has a size of 4k (coordinates of the boxes, their height and width) and the output of the box classification layer a size of 2k ("objectness" scores to detect an object or not in the box). The k region proposals detected by the sliding window are called anchors.

When the anchor boxes are detected, they are selected by applying a threshold over the "objectness" score to keep only the relevant boxes. These anchor boxes and the feature maps computed by the initial CNN model feeds a Fast R-CNN model.

The entire image feeds a CNN model to produce anchor boxes as region proposals with a confidence to contain an object. A Fast R-CNN is used taking as inputs the feature maps and the region proposals. For each box, it produces probabilities to detect each object and correction over the location of the box.

Faster R-CNN uses RPN to avoid the selective search method, it accelerates the training and testing processes, and improve the performances. The RPN uses a pre-trained model over the ImageNet dataset for classification and it is fine-tuned on the PASCAL VOC dataset. Then the generated region proposals with anchor boxes are used to train the Fast R-CNN. This process is iterative.

Region-Based Fully Convolutional Network (R-FCN)

Fast and Faster R-CNN methodologies consist in detecting region proposals and recognize an object in each region. The Region-based Fully Convolutional Network (R-FCN) is a model with only convolutional layers allowing complete backpropagation for training and inference. The method merged the two basic steps in a single model to take into account simultaneously the object detection (location invariant) and its position (location variant).

A ResNet-101 model takes the initial image as input. The last layer outputs feature maps, each one is specialized in the detection of a category at some location. For example, one feature map is specialized in the detection of a cat, another one in a banana and so on. Such feature maps are called position-sensitive score maps because they take into account the spatial localization of a particular object. It consists of $k*k*(C+1)$ score maps where k is the size of the score map, and C the number of classes. All these maps form the score bank. Basically, we create patches that can recognize part of an object. For example, for k=3, we can recognize 3×3 parts of an object.

In parallel, the method runs a RPN to generate Region of Interest (RoI). Finally, the method cuts each RoI in bins and checks them against the score bank. If enough of these parts are activated, then the patch vote 'yes', I recognized the object.

You Only Look Once (YOLO)

The YOLO model directly predicts bounding boxes and class probabilities with a single network in a single evaluation. The simplicity of the YOLO model allows real-time predictions.

Initially, the model takes an image as input. It divides it into an S×S grid. Each cell of this grid predicts B bounding boxes with a confidence score. This confidence is simply the probability to detect the object multiply by the IoU between the predicted and the ground truth boxes.

The CNN used is inspired by the GoogLeNet model introducing the inception modules. The network has 24 convolutional layers followed by 2 fully-connected layers. Reduction layers with 1×1 filters[4] followed by 3×3 convolutional layers replace the initial inception modules. The Fast YOLO model is a lighter version with only 9 convolutional layers and fewer number of filters. Most of the convolutional layers are pretrained using the ImageNet dataset with classification. Four convolutional layers followed by two fully-connected layers are added to the previous network and it is entirely retrained with the PASCAL VOC datasets.

The final layer outputs a S*S*(C+B*5) tensor corresponding to the predictions for each cell of the grid. C is the number of estimated probabilities for each class. B is the fixed number of anchor boxes per cell, each of these boxes being related to 4 coordinates (coordinates of the center of the box, width and height) and a confidence value.

With the previous models, the predicted bounding boxes often contained an object. The YOLO model however predicts a high number of bounding boxes. Thus there are a lot of bounding boxes without any object. The Non-Maximum Suppression (NMS) method is applied at the end of the network. It consists in merging highly-overlapping bounding boxes of a same object into a single one.

Single-Shot Detector (SSD)

A Single-Shot Detector (SSD) model predicts all at once the bounding boxes and the class probabilities with an end-to-end CNN architecture.

The model takes an image as the input which passes through multiple convolutional layers with different sizes of filter (10×10, 5×5 and 3×3). Feature maps from convolutional layers at different position of the network are used to predict the bounding boxes. They are processed by a specific convolutional layers with 3×3 filters called extra feature layers to produce a set of bounding boxes similar to the anchor boxes of the Fast R-CNN.

Each box has 4 parameters: the coordinates of the center, the width and the height. At the same time, it produces a vector of probabilities corresponding to the confidence over each class of object.

The Non-Maximum Suppression method is also used at the end of the SSD model to keep the most relevant bounding boxes. The Hard Negative Mining (HNM) is then used because a lot of negative boxes are still predicted. It consists in selecting only a subpart of these boxes during the training. The boxes are ordered by confidence and the top is selected depending on the ratio between the negative and the positive which is at most ⅓.

Neural Architecture Search Net (NASNet)

The Neural Architecture Search consists in learning the architecture of a model to optimize the number of layers while improving the accuracy over a given dataset.

The NASNet network has an architecture learned from the CIFAR-10 dataset and is trained with the ImageNet dataset. This model is used for feature maps generation and is stacked into the Faster R-CNN pipeline. Then the entire pipeline is retrained with the COCO dataset.

Mask Region-Based Convolutional Network (Mask R-CNN)

Another extension of the Faster R-CNN model adds a parallel branch to the bounding box detection in order to predict object mask. The mask of an object is its segmentation by pixel in an image. This model outperforms the state-of-the-art in the four COCO challenges: the instance segmentation, the bounding box detection, the object detection and the key point detection.

The Mask Region-based Convolutional Network (Mask R-CNN) uses the Faster R-CNN pipeline with three output branches for each candidate object: a class label, a bounding box offset and the object mask. It uses Region Proposal Network (RPN) to generate bounding box proposals and produces the three outputs at the same time for each Region of Interest (RoI).

The initial RoIPool layer used in the Faster R-CNN is replaced by a RoIAlign layer. It removes the quantization of the coordinates of the original RoI and computes the exact values of the locations. The RoIAlign layer provides scale-equivariance and translation-equivariance with the region proposals.

The model takes an image as input and feeds a ResNeXt network with 101 layers. This model looks like a ResNet but each residual block is cut into lighter transformations which are aggregated to add sparsity in the block. The model detects RoIs which are processed using a RoIAlign layer. One branch of the network is linked to a fully-connected layer to compute the coordinates of the bounding boxes and the probabilities associated to the objects. The other branch is linked to two convolutional layers, the last one computes the mask of the detected object.

Three loss functions associated to each task to solve are summed. This sum is minimized and produces great performances because solving the segmentation task improve the localization and thus the classification.

An embodiment of an augmented reality environment involves a user wearing headset that interacts with physical objects virtualized in the augmented reality environment. In this example the user interacts with either a purely virtual document, or a physical document that is virtualized as a virtual document on a virtual surface in the augmented reality environment. In this embodiment, an imaging sensor is directed toward a physical surface, and superimposing logic receives a sensor output (e.g., image or video) from the imaging sensor. Superimposing logic transforms the sensor output into a virtual document superimposed on a virtual surface representing the physical surface in the augmented reality environment.

In other embodiments there may be no physical surface and no physical document on the physical surface, in which case the environment would be a purely virtual reality (VR) environment, not an augmented reality environment. Thus there are many possibilities for the environment—it could be purely virtual, or a physical surface that is virtualized and augmented with a virtual document, or both the physical surface and a physical document could be virtualized.

In one embodiment a virtual environment receives input from the user and in response sends an interaction signal to a virtual object, a virtual surface or an application. The virtual object or virtual surface or application sends an action to an operating system and in response the operating system operates the hardware to implement the action in the augmented or virtual environment.

A wearable augmented reality ("AR") device may be a computer device in the form of a wearable headset, comprising a headpiece, which is a headband, arranged to be worn on the wearer's head. The headpiece has a central portion intended to fit over the nose bridge of a wearer, and has an inner curvature intended to wrap around the wearer's head above their ears.

The headpiece supports a left optical component and a right optical component, which are waveguides. For ease of reference herein an optical component will be considered to be either a left or right component, because in the described embodiment the components are essentially identical apart from being mirror images of each other. Therefore, all description pertaining to the left-hand component also pertains to the right-hand component. The device comprises augmented reality device logic as follows.

The augmented reality device logic comprises a graphics engine 1902, which may comprise a micro display and imaging optics in the form of a collimating lens (not shown). The micro display can be any type of image source, such as liquid crystal on silicon (LCOS) displays, transmissive liquid crystal displays (LCD), matrix arrays of LED's (whether organic or inorganic) and any other suitable display. The display is driven by circuitry known in the art to activate individual pixels of the display to generate an image. Substantially collimated light, from each pixel, falls on an exit pupil of the graphics engine. At the exit pupil, the collimated light beams are coupled into each of the left optical component and the right optical component into a respective left in-coupling zone 1810 and right-in-coupling zone. In-coupled light is then guided, through a mechanism that involves diffraction and TIR, laterally of the optical component in a respective left intermediate zone and, and also downward into a respective left exit zone and right exit zone where it exits towards the users' eye.

The collimating lens collimates the image into a plurality of beams, which form a virtual version of the displayed image, the virtual version being a virtual image at infinity in the optics sense. The light exits as a plurality of beams, corresponding to the input beams and forming substantially the same virtual image, which the lens of the eye projects onto the retina to form a real image visible to the user. In this manner, the left optical component 1806 and the right optical component project the displayed image onto the wearer's eyes.

The various optical zones can, for example, be suitably arranged diffractions gratings or holograms. Each optical component has a refractive index n which is such that total internal reflection takes place to guide the beam from the light engine along the respective intermediate expansion zone, and down towards respective the exit zone.

Each optical component is substantially transparent, whereby the wearer can see through it to view a real-world environment in which they are located simultaneously with the projected image, thereby providing an augmented reality experience.

To provide a stereoscopic image, i.e. that is perceived as having 3D structure by the user, slightly different versions of a 2D image can be projected onto each eye for example from multiple graphics engine (i.e. two micro displays), or from the same light engine (i.e. one micro display) using suitable optics to split the light output from the single display.

The device is just one exemplary configuration. For instance, where two light-engines are used, these may instead be at separate locations to the right and left of the device (near the wearer's ears). Moreover, while in this example, the input beams that form the virtual image are generated by collimating light from the display, an alternative light engine based on so-called scanning can replicate this effect with a single beam, the orientation of which is fast modulated whilst simultaneously modulating its intensity and/or color. A virtual image can be simulated in this manner that is equivalent to a virtual image that would be created by collimating light of a (real) image on a display with collimating optics. Alternatively, a similar AR experience can be provided by embedding substantially transparent pixels in a glass or polymer plate in front of the wearer's eyes, having a similar configuration to the left optical component and right optical component though without the need for the zone structures.

Other headpiece embodiments are also within the scope of the subject matter. For instance, the display optics can equally be attached to the user's head using a frame (in the manner of conventional spectacles), helmet or other fit system. The purpose of the fit system is to support the display and provide stability to the display and other head borne systems such as tracking systems and cameras. The fit system can be designed to meet user population in anthropometric range and head morphology and provide comfortable support of the display system.

The device also comprises one or more camera—for example left stereo camera and right stereo camera mounted on the headpiece and configured to capture an approximate view ("field of view") from the user's left and right eyes respectfully in this example. The cameras are located towards either side of the user's head on the headpiece, and thus capture images of the scene forward of the device form slightly different perspectives. In combination, the stereo camera's capture a stereoscopic moving image of the real-world environment as the device moves through it. A stereoscopic moving image means two moving images showing slightly different perspectives of the same scene, each formed of a temporal sequence of frames to be played out in quick succession to replicate movement. When combined, the two images give the impression of moving 3D structure.

A left microphone and a right microphone are located at the front of the headpiece (from the perspective of the wearer), and left and right channel speakers, earpiece or other audio output transducers are to the left and right of the headpiece. These are in the form of a pair of bone conduction audio transducers functioning as a left speaker and right speaker audio channel output.

The augmented reality device logic in one embodiment comprises a graphics engine, a camera, processing units, including one or more CPU and/or GPU, a WiFi wireless interface, a Bluetooth wireless interface, speakers, microphones, and one or more memory.

The processing units may in some cases comprise programmable devices such as bespoke processing units optimized for a particular function, such as AR related functions. The augmented reality device logic may comprise other components that are not shown, such as dedicated depth sensors, additional interfaces etc.

Some or all of these components may be housed in an AR headset. In some embodiments, some of these components may be housed in a separate housing connected or in wireless communication with the components of the AR headset. For example, a separate housing for some components may be designed to be worn or a belt or to fit in the wearer's pocket, or one or more of the components may be housed in a separate computer device (smartphone, tablet, laptop or desktop computer etc.) which communicates wirelessly with the display and camera apparatus in the AR headset, whereby the headset and separate device constitute the full augmented reality device logic.

The memory comprises logic to be applied to the processing units to execute. In some cases, different parts of the logic may be executed by different components of the processing units. The logic typically comprises code of an operating system, as well as code of one or more applications configured to run on the operating system to carry out aspects of the processes disclosed herein.

An AR device may include processing units, input devices, memory, output devices, storage devices, a network interface, and various logic to carry out the processes disclosed herein.

The input devices comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices are provided via various machine signal conductors (e.g., busses or network interfaces) and circuits to memory.

The memory provides for storage (via configuration of matter or states of matter) of signals received from the input devices, instructions and information for controlling operation of the processing units, and signals from storage devices. The memory may in fact comprise multiple memory devices of different types, for example random access memory devices and non-volatile (e.g., FLASH memory) devices.

Information stored in the memory is typically directly accessible to the processing units of the device. Signals input to the AR device cause the reconfiguration of the internal material/energy state of the memory, creating logic that in essence forms a new machine configuration, influencing the behavior of the AR device by affecting the behavior of the processing units 2002 with control signals (instructions) and data provided in conjunction with the control signals.

The storage devices may provide a slower but higher capacity machine memory capability. Examples of storage devices are hard disks, optical disks, large capacity flash memories or other non-volatile memory technologies, and magnetic memories.

The processing units may cause the configuration of the memory to be altered by signals in the storage devices. In other words, the processing units may cause data and instructions to be read from storage devices in the memory from which may then influence the operations of processing units as instructions and data signals, and from which it may also be provided to the output devices. The processing units may alter the content of the memory by signaling to a machine interface of memory to alter the internal configuration, and then converted signals to the storage devices to alter its material internal configuration. In other words, data and instructions may be backed up from memory, which is often volatile, to storage devices, which are often non-volatile.

Output devices are transducers which convert signals received from the memory into physical phenomenon such as vibrations in the air, or patterns of light on a machine display, or vibrations (i.e., haptic devices) or patterns of ink or other materials (i.e., printers and 3-D printers).

The network interface receives signals from the memory or processing units and converts them into electrical, optical, or wireless signals to other machines, typically via a machine network. The network interface also receives signals from the machine network and converts them into electrical, optical, or wireless signals to the memory or processing units.

In a recurrent neural network (RNN) the variable $x[t]$ is the input at stage t. For example, $x[1]$ could be a one-hot vector corresponding to the second word of a sentence. Variable $s[t]$ is the hidden state at stage t. It's the "memory" of the network. The variable $s[t]$ is calculated based on the previous hidden state and the input at the current stage: $s[t], f(Ux[t]+Ws[t-1])$. The activation function f usually is a nonlinearity such as tanh or ReLU. The input $s(-1)$, which is required to calculate the first hidden state, is typically initialized to all zeroes. Variable $o[t]$ is the output at stage t. For example, to predict the next word in a sentence it would be a vector of probabilities across the vocabulary: $o[t]=$ softmax$(Vs[t])$.

A bidirectional recurrent neural network (BRNN) is designed for situation where the output at a stage may not only depend on the previous inputs in the sequence, but also future elements. For example, to predict a missing word in a sequence a BRNN will consider both the left and the right context. BRNNs may be implemented as two RNNs in which the output Y is computed based on the hidden states S of both RNNs and the inputs X. In a bidirectional recurrent neural network each node is typically itself a neural network. Deep BRNNs are similar to BRNNs, but have multiple layers per node. In practice this enables a higher learning capacity but also requires more training data than for single layer networks.

All RNNs have the form of a chain of repeating nodes, each node being a neural network. In standard RNNs, this repeating node will have a structure such as a single layer with a tanh activation function. An LSTMs also has this chain like design, but the repeating node has a different structure than for regular RNNs. Instead of having a single neural network layer, there are typically four, and the layers interact in a particular way.

In an LSTM each path carries an entire vector, from the output of one node to the inputs of others.

An important feature of LSTMs is the cell state Ct, which may be visualized as a horizontal line running through the long short-term memory. The cell state is like a conveyor belt. It runs across the entire chain, with only some minor linear interactions. It's entirely possible for signals to flow along it unchanged. The LSTM has the ability to remove or add information to the cell state, carefully regulated by structures called gates. Gates are a way to optionally let information through a cell. They are typically formed using a sigmoid neural net layer and a pointwise multiplication operation.

The sigmoid layer outputs numbers between zero and one, describing how much of each component should be let through. A value of zero means "let nothing through," while a value of one means "let everything through". An LSTM has three of these sigmoid gates, to protect and control the cell state.

Typical AR device logic comprises the following functional modules: a rendering engine, local augmentation logic, local modeling logic, device tracking logic, an encoder, and a decoder. Each of these functional modules may be implemented in software, dedicated hardware, firmware, or a combination of these logic types.

The rendering engine controls the graphics engine to generate a stereoscopic image visible to the wearer, i.e. to generate slightly different images that are projected onto different eyes by the optical components of a headset substantially simultaneously, so as to create the impression of 3D structure.

The stereoscopic image is formed by rendering engine rendering at least one virtual display element ("augmentation"), which is perceived as a 3D element, i.e. having perceived 3D structure, at a real-world location in 3D space by the user.

An augmentation is defined by an augmentation object stored in the memory. The augmentation object comprises: location data defining a desired location in 3D space for the virtual element (e.g. as (x,y,z) Cartesian coordinates); structural data defining 3D surface structure of the virtual element, i.e. a 3D model of the virtual element; and image data defining 2D surface texture of the virtual element to be applied to the surfaces defined by the 3D model. The augmentation object may comprise additional information, such as a desired orientation of the augmentation.

The perceived 3D effects are achieved though suitable rendering of the augmentation object. To give the impression of the augmentation having 3D structure, a stereoscopic image is generated based on the 2D surface and 3D augmentation model data in the data object, with the augmentation being rendered to appear at the desired location in the stereoscopic image.

A 3D model of a physical object is used to give the impression of the real-world having expected tangible effects on the augmentation, in the way that it would a real-world object. The 3D model represents structure present in the real world, and the information it provides about this structure allows an augmentation to be displayed as though it were a real-world 3D object, thereby providing an immersive augmented reality experience. The 3D model is in the form of 3D mesh.

For example, based on the model of the real-world, an impression can be given of the augmentation being obscured by a real-world object that is in front of its perceived location from the perspective of the user; dynamically interacting with a real-world object, e.g. by moving around the object; statically interacting with a real-world object, say by sitting on top of it etc.

Whether or not real-world structure should affect an augmentation can be determined based on suitable rendering criteria. For example, by creating a 3D model of the perceived AR world, which includes the real-world surface structure and any augmentations, and projecting it onto a plane along the AR user's line of sight as determined using pose tracking (see below), a suitable criteria for determining whether a real-world object should be perceived as partially obscuring an augmentation is whether the projection of the real-world object in the plane overlaps with the projection of the augmentation, which could be further refined to account for transparent or opaque real world structures. Generally the criteria can depend on the location and/or orientation of the augmented reality device and/or the real-world structure in question.

An augmentation can also be mapped to the mesh, in the sense that its desired location and/or orientation is defined relative to a certain structure(s) in the mesh. Should that structure move and/or rotate causing a corresponding change in the mesh, when rendered properly this will cause corresponding change in the location and/or orientation of the augmentation. For example, the desired location of an augmentation may be on, and defined relative to, a table top structure; should the table be moved, the augmentation moves with it. Object recognition can be used to this end, for example to recognize a known shape of table and thereby detect when the table has moved using its recognizable structure. Such object recognition techniques are known in the art.

An augmentation that is mapped to the mash in this manner, or is otherwise associated with a particular piece of surface structure embodied in a 3D model, is referred to an "annotation" to that piece of surface structure. In order to annotate a piece of real-world surface structure, it is necessary to have that surface structure represented by the 3D model in question—without this, the real-world structure cannot be annotated.

The local modeling logic generates a local 3D model "LM" of the environment in the memory, using the AR device's own sensor(s) e.g. cameras and/or any dedicated depth sensors etc. The local modeling logic and sensor(s) constitute sensing apparatus.

The device tracking logic tracks the location and orientation of the AR device, e.g. a headset, using local sensor readings captured from the AR device. The sensor readings can be captured in a number of ways, for example using the cameras and/or other sensor(s) such as accelerometers. The device tracking logic determines the current location and orientation of the AR device and provides this information to the rendering engine, for example by outputting a current "pose vector" of the AR device. The pose vector is a six dimensional vector, for example (x, y, z, P, R, Y) where (x,y,z) are the device's Cartesian coordinates with respect to a suitable origin, and (P, R, Y) are the device's pitch, roll and yaw with respect to suitable reference axes.

The rendering engine adapts the local model based on the tracking, to account for the movement of the device i.e. to maintain the perception of the as 3D elements occupying the real-world, for example to ensure that static augmentations appear to remain static (which will in fact be achieved by scaling or rotating them as, from the AR user's perspective, the environment is moving relative to them).

The encoder receives image data from the cameras and audio data from the microphones and possibly other types of data (e.g., annotation or text generated by the user of the AR device using the local augmentation logic) and transmits that information to other devices, for example the devices of collaborators in the AR environment. The decoder receives an incoming data stream from other devices, and extracts audio, video, and possibly other types of data (e.g., annotations, text) therefrom.

Figure 5:
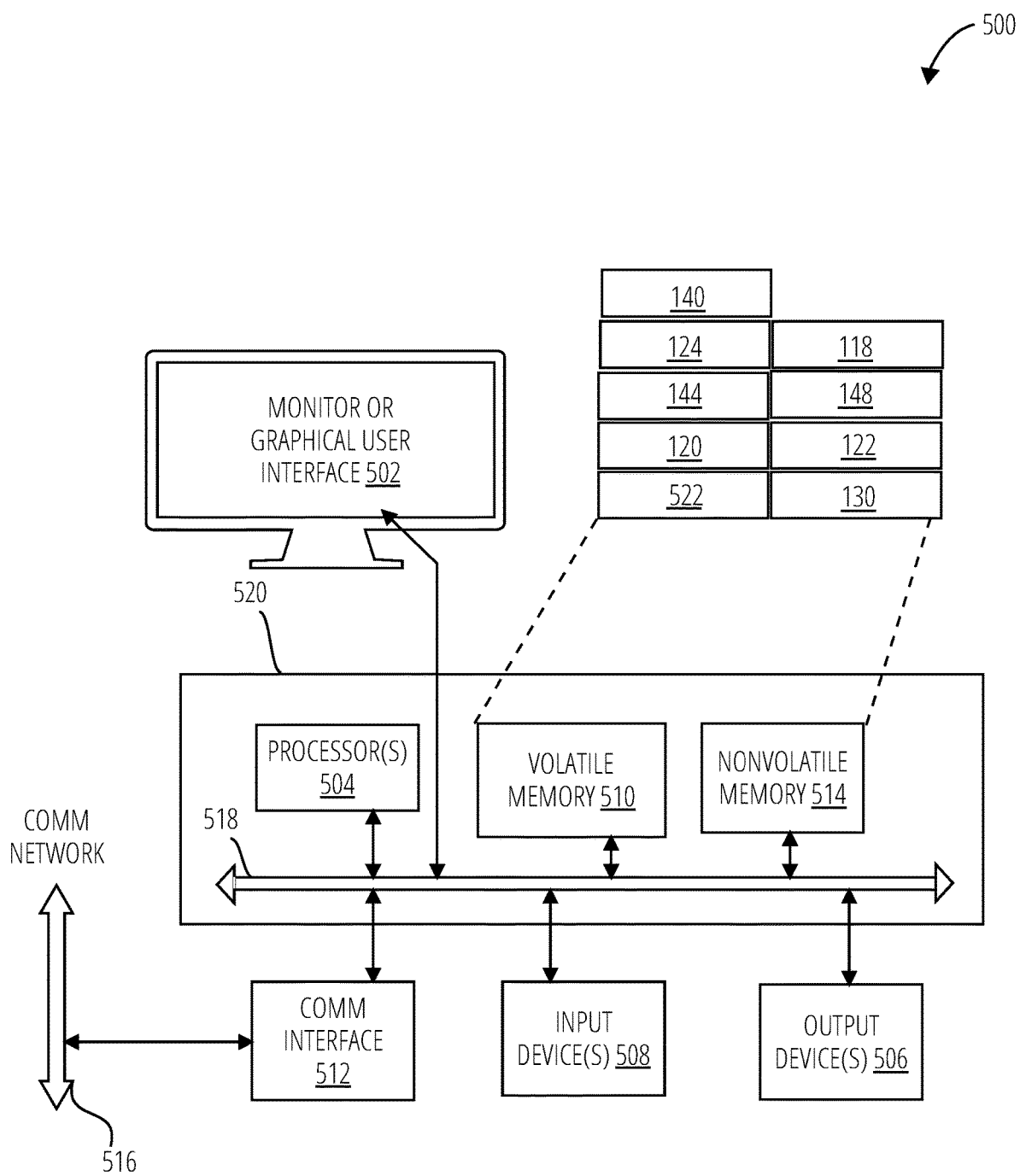
FIG. 5 is an example block diagram of a computing device 500 that may incorporate embodiments of the present invention.
Figure 6:
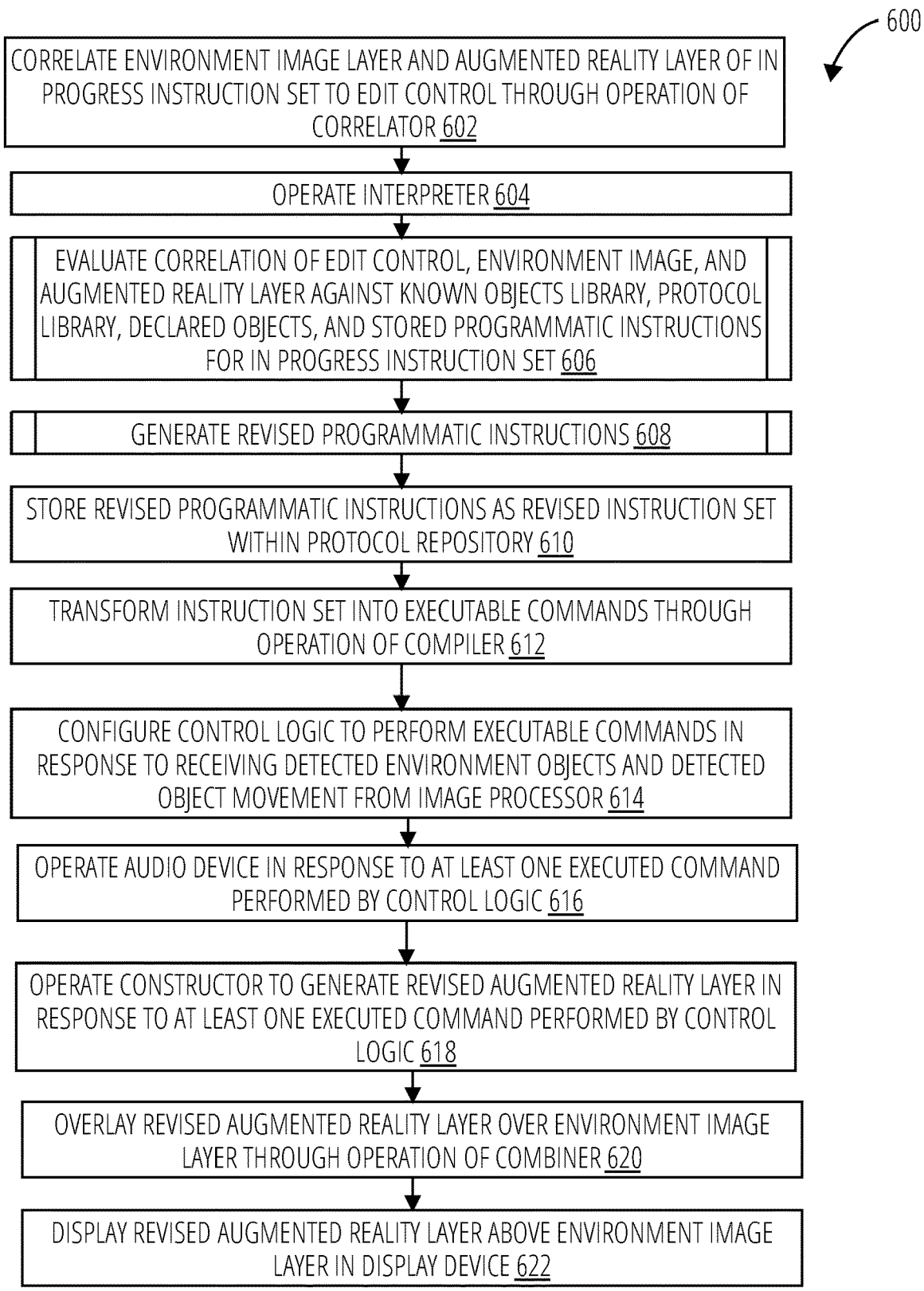
Figure 7:
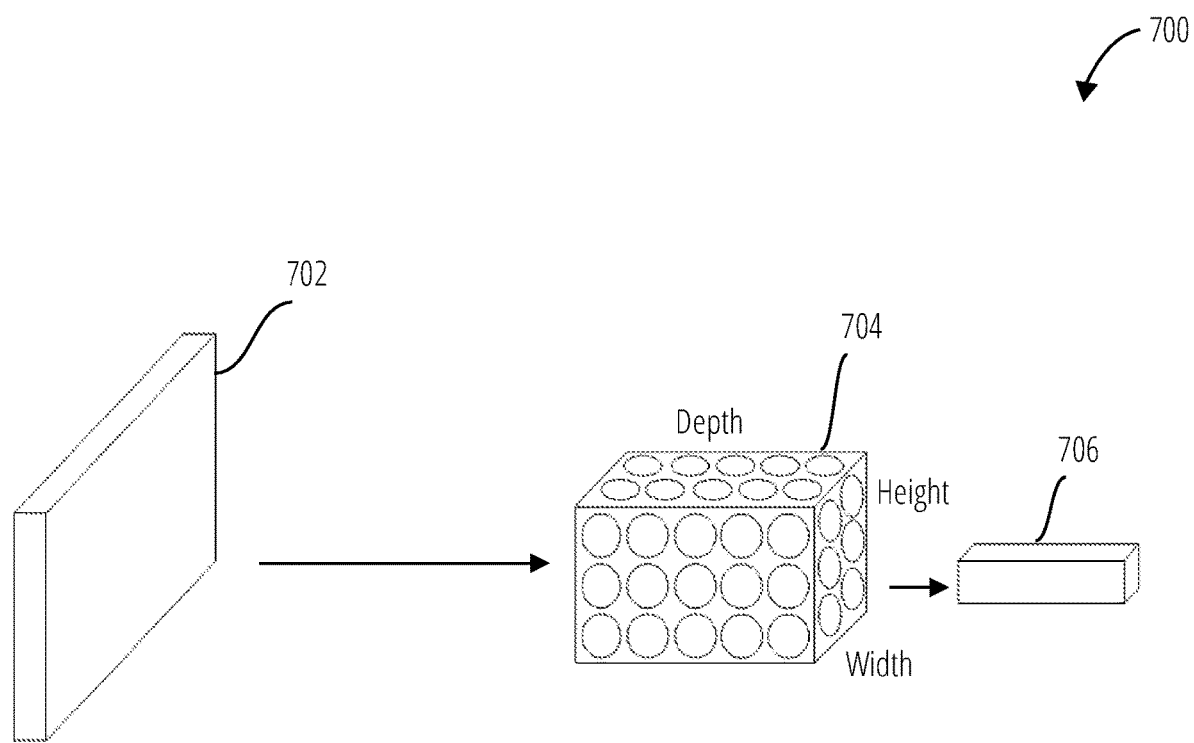
Figure 8:
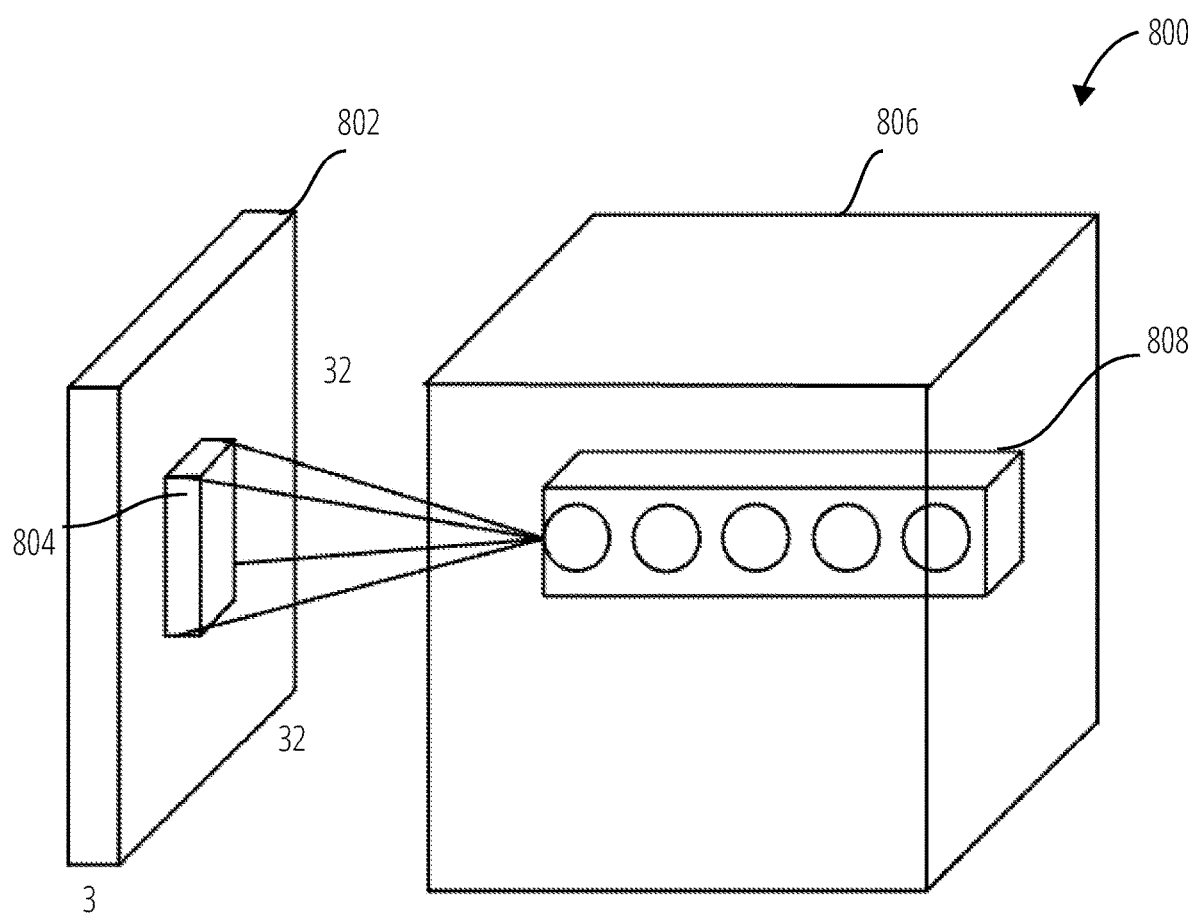
Figure 9:
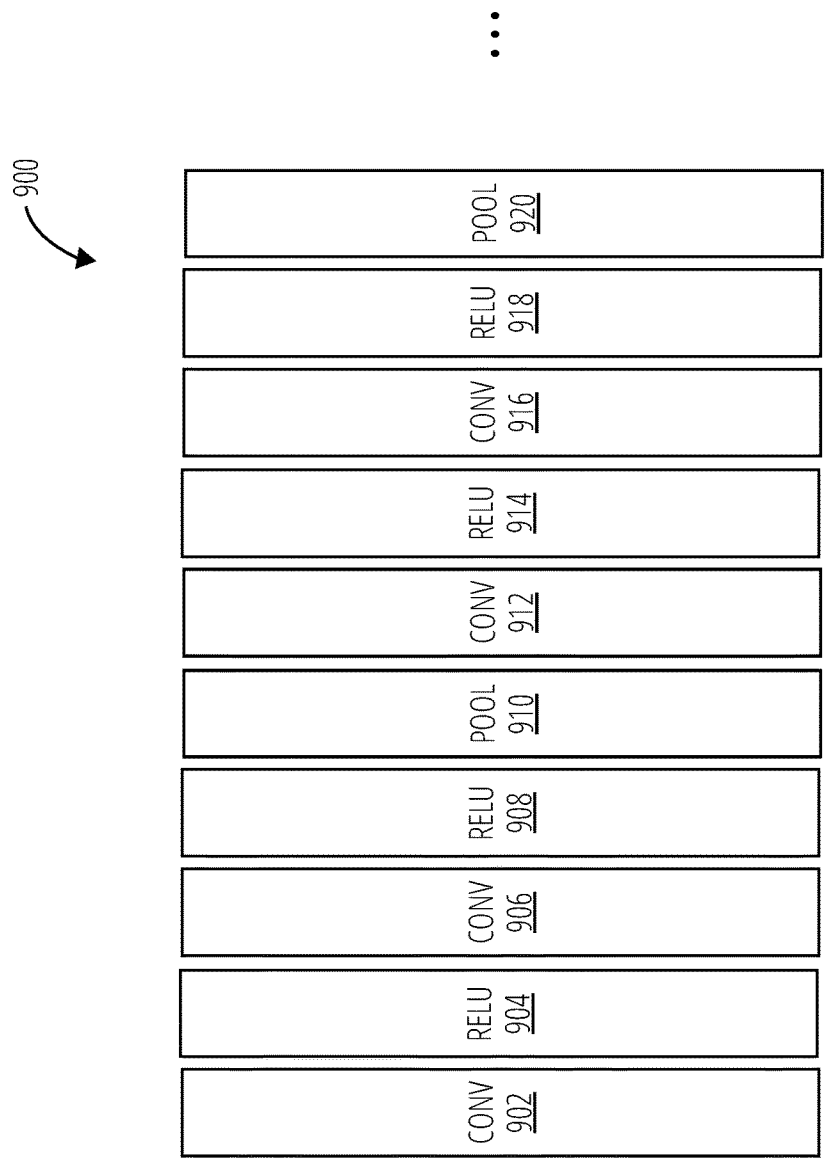
Figure 10:
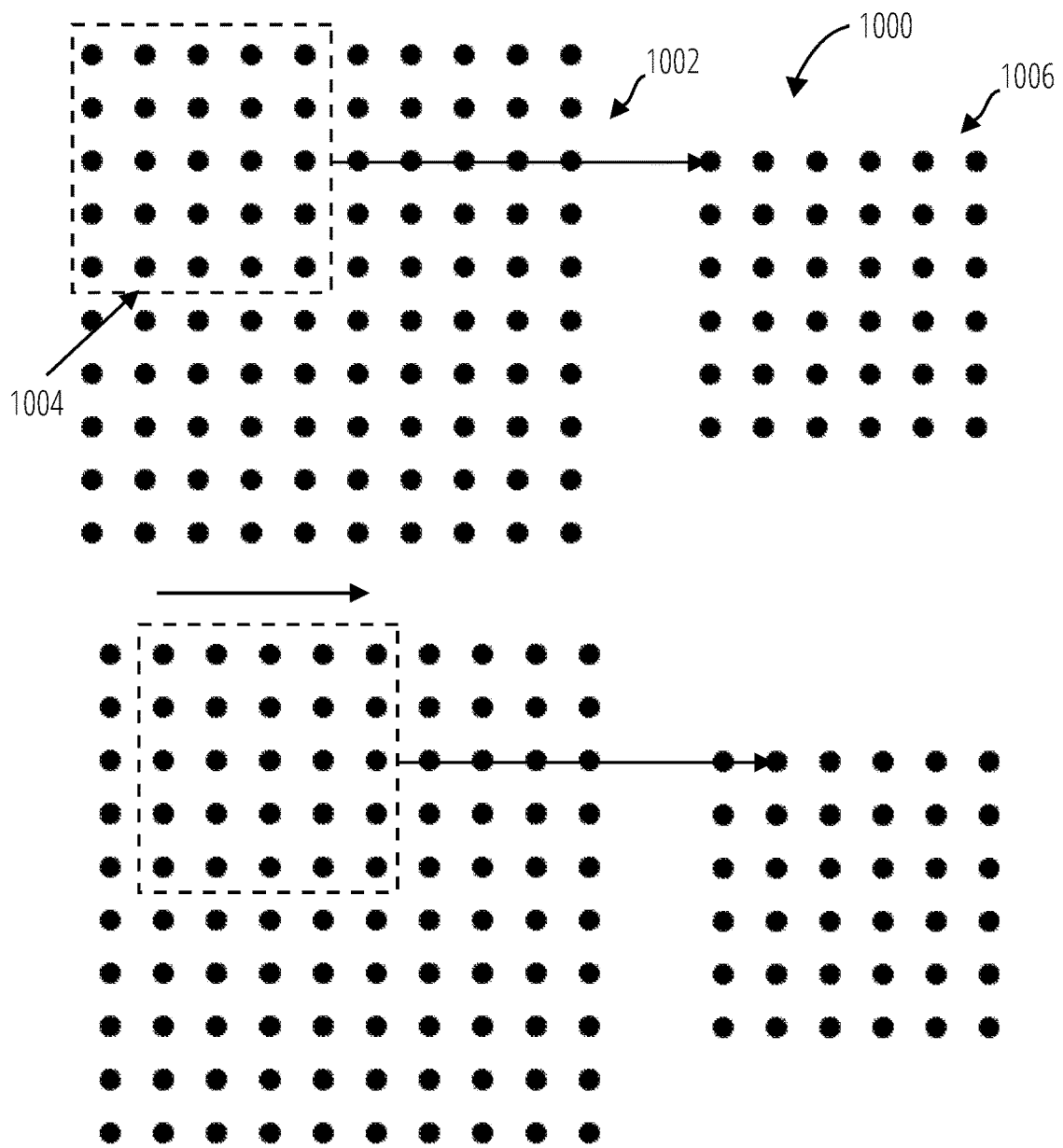
Figure 11:
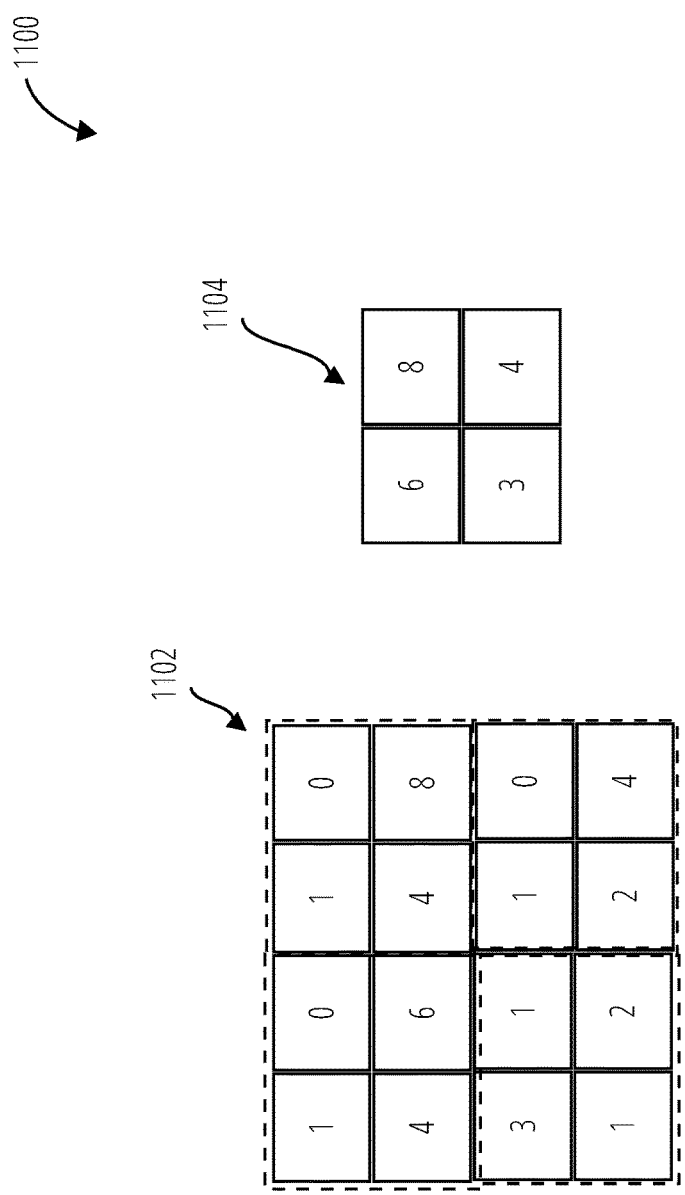
Figure 12:
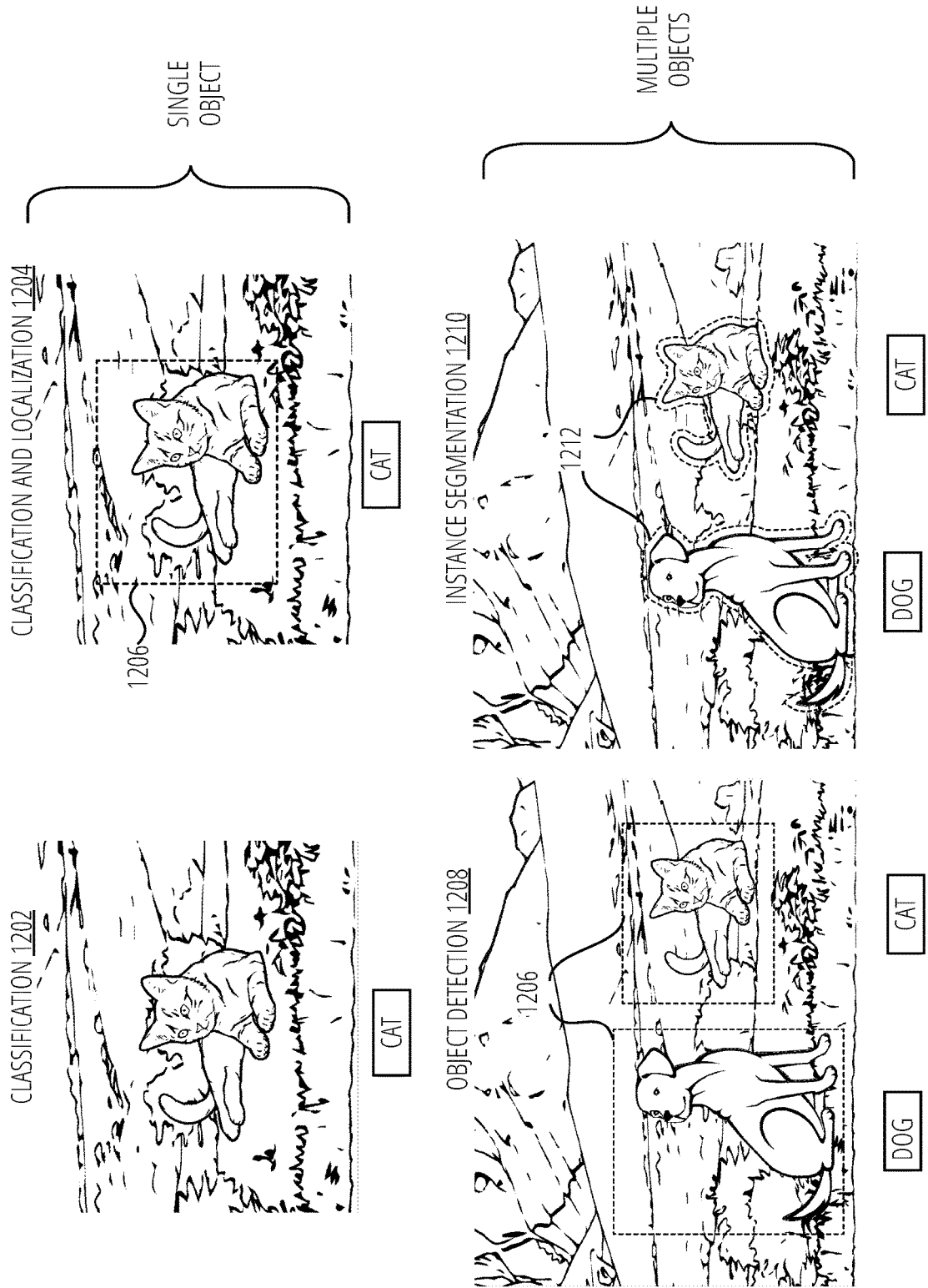
Figure 13:
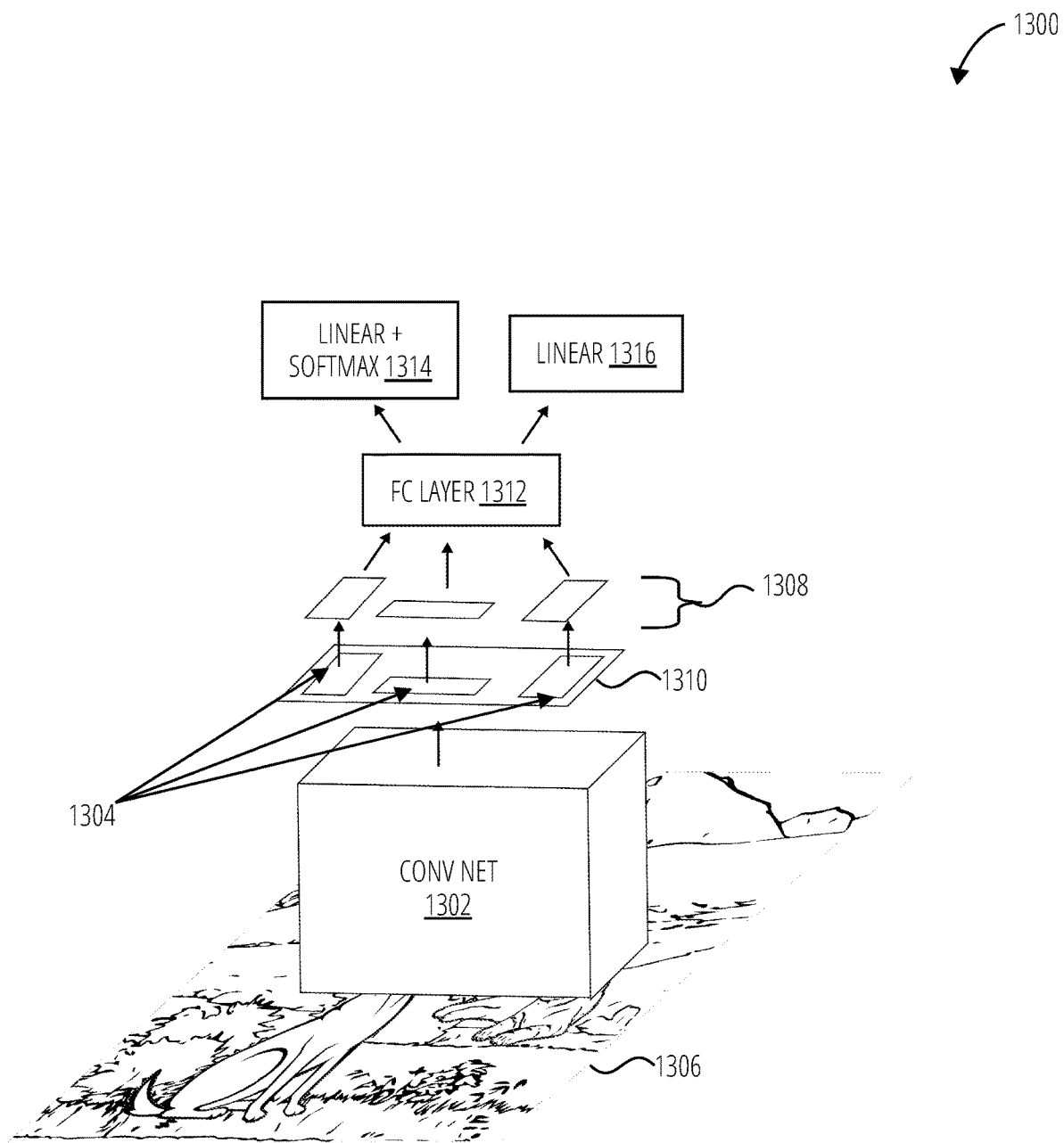
Figure 14:
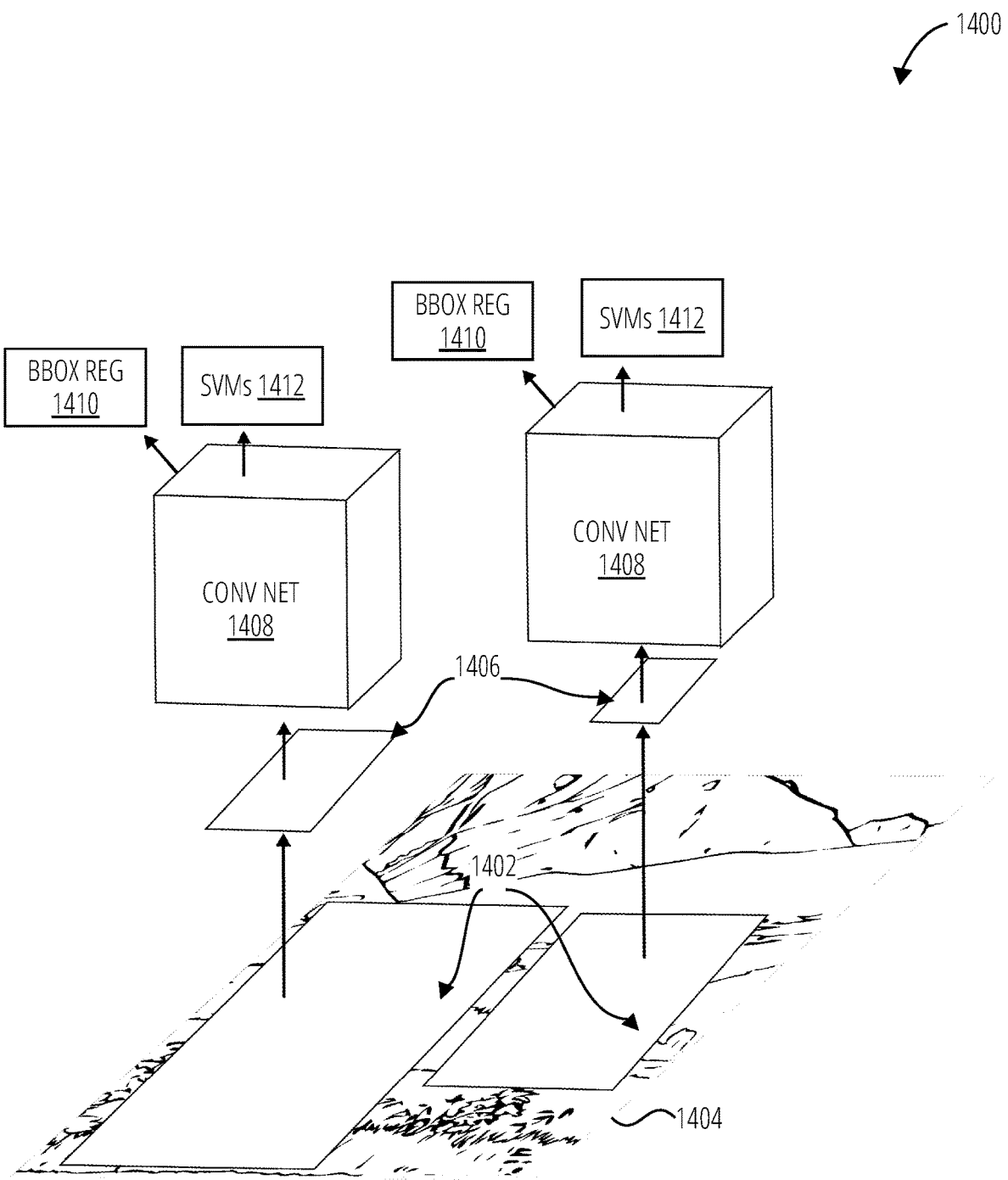
Figure 15:
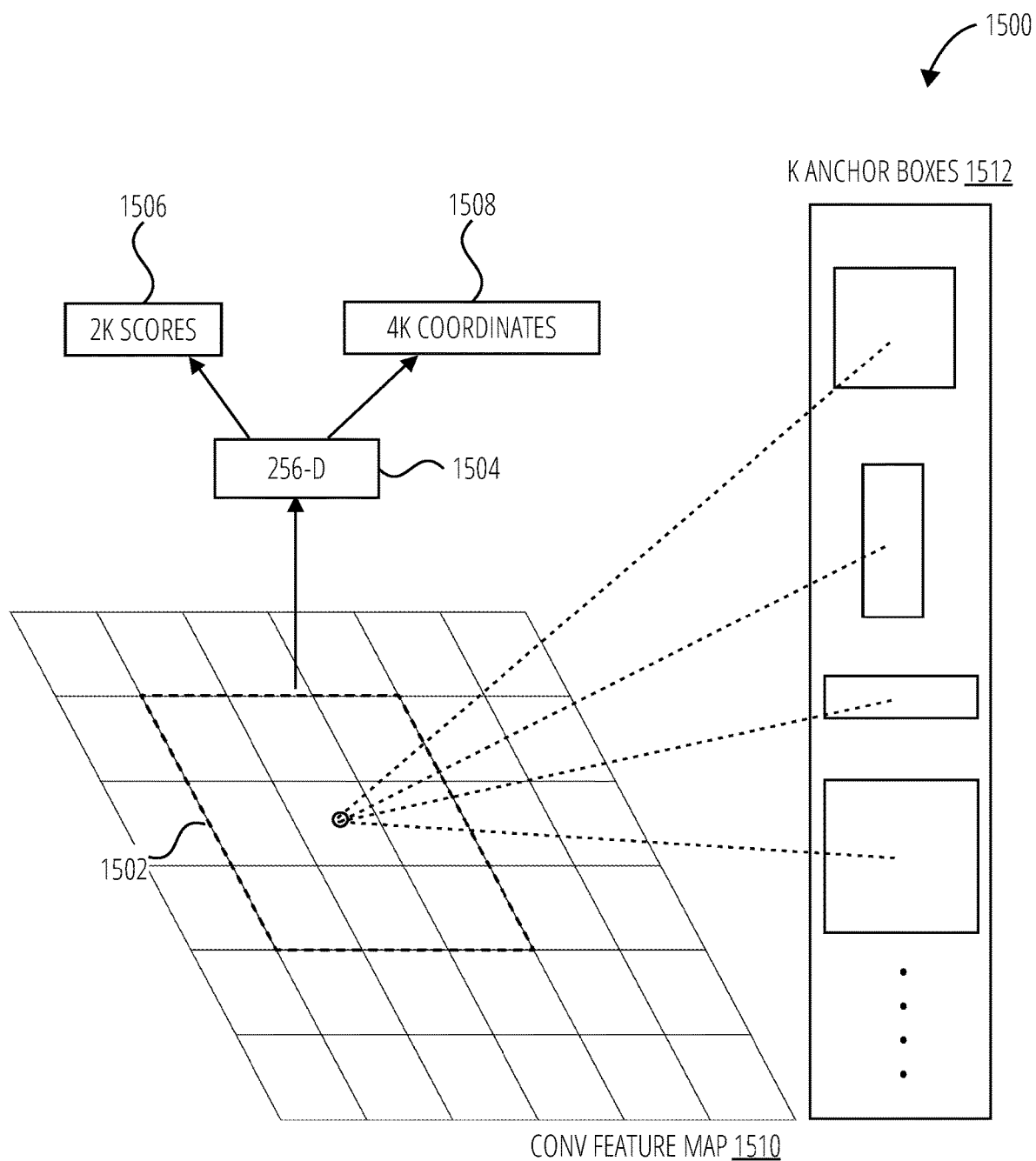
Figure 16:
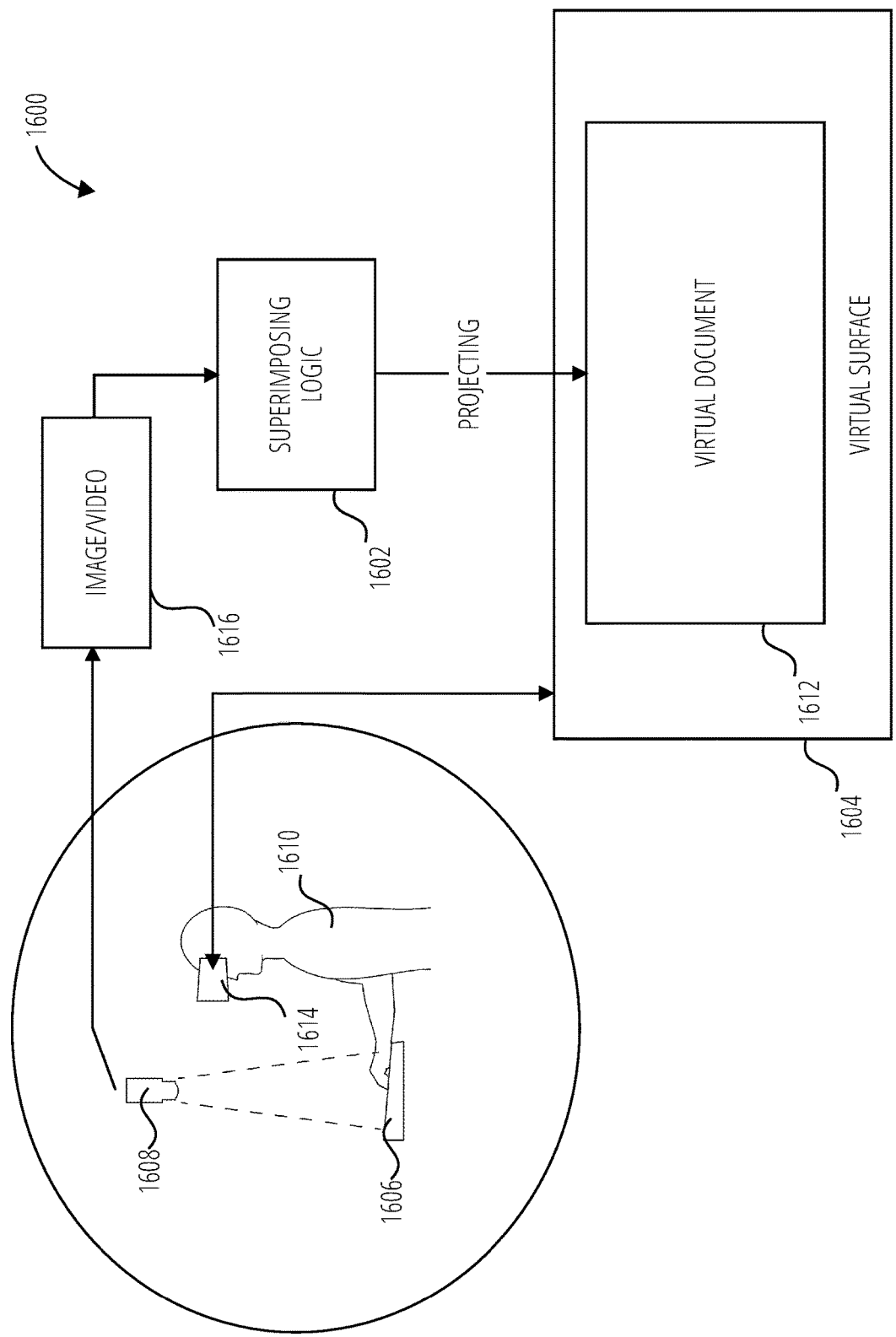
Figure 17:
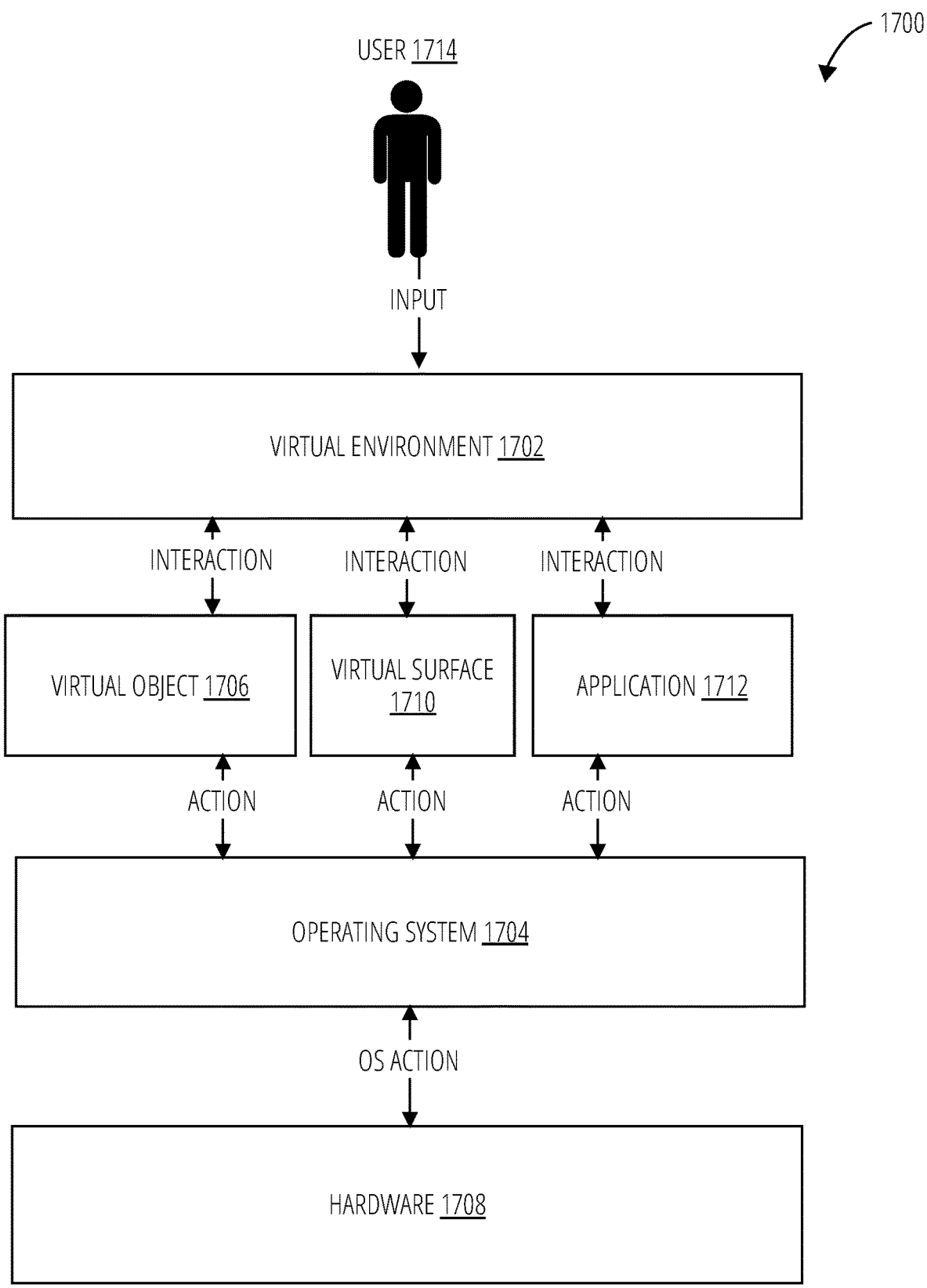
Figure 18:
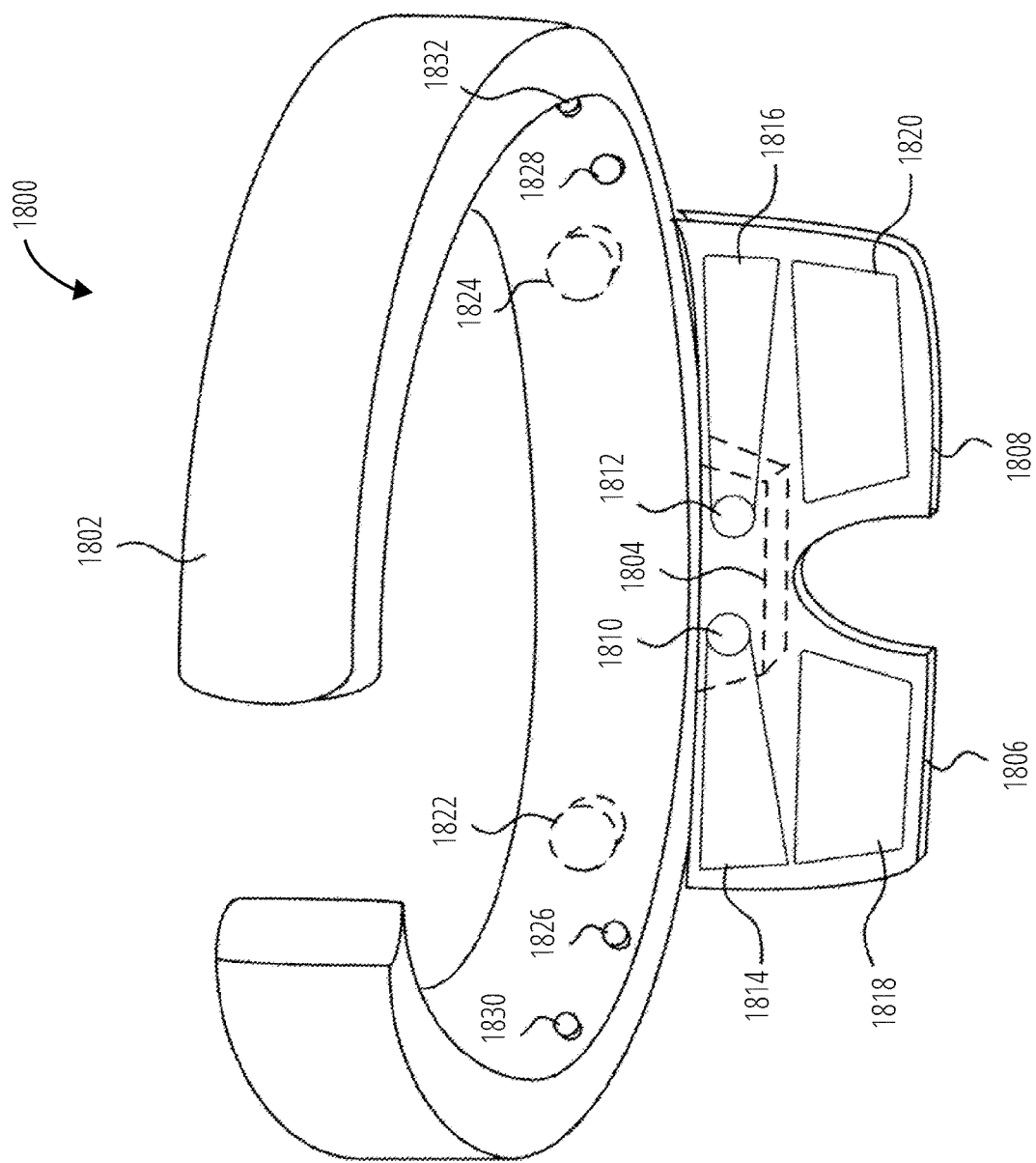
Figure 19:
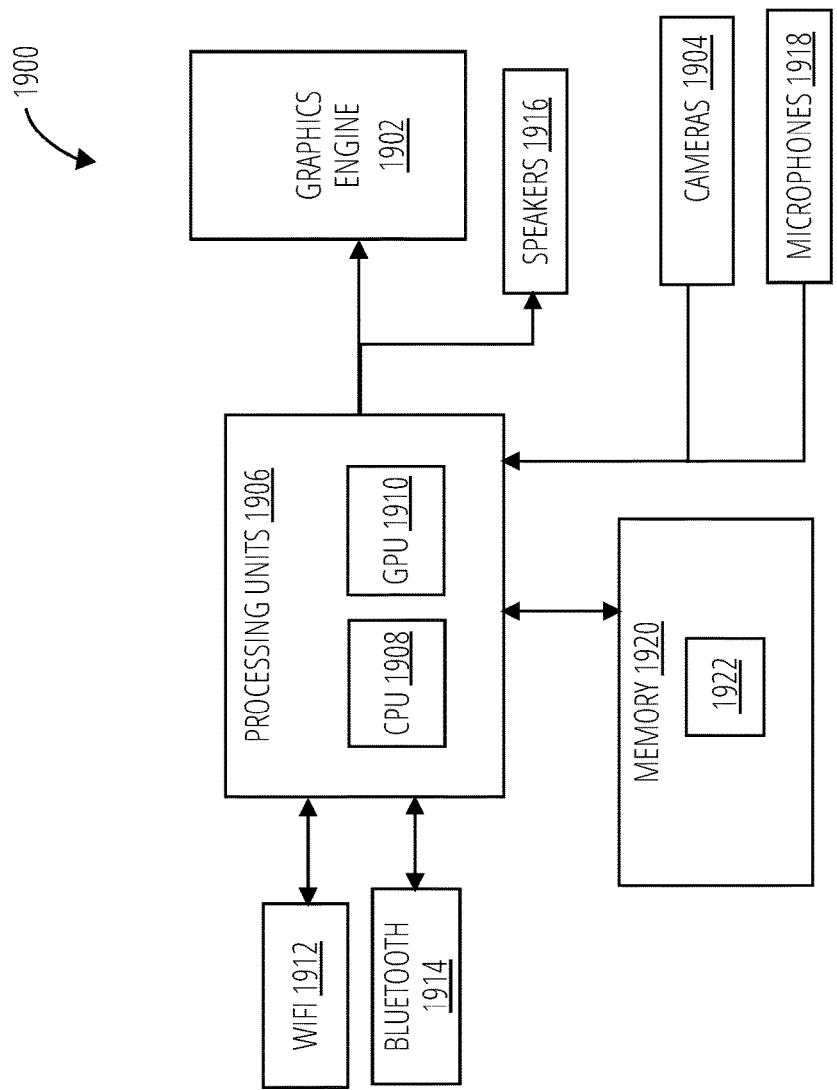
Figure 20:
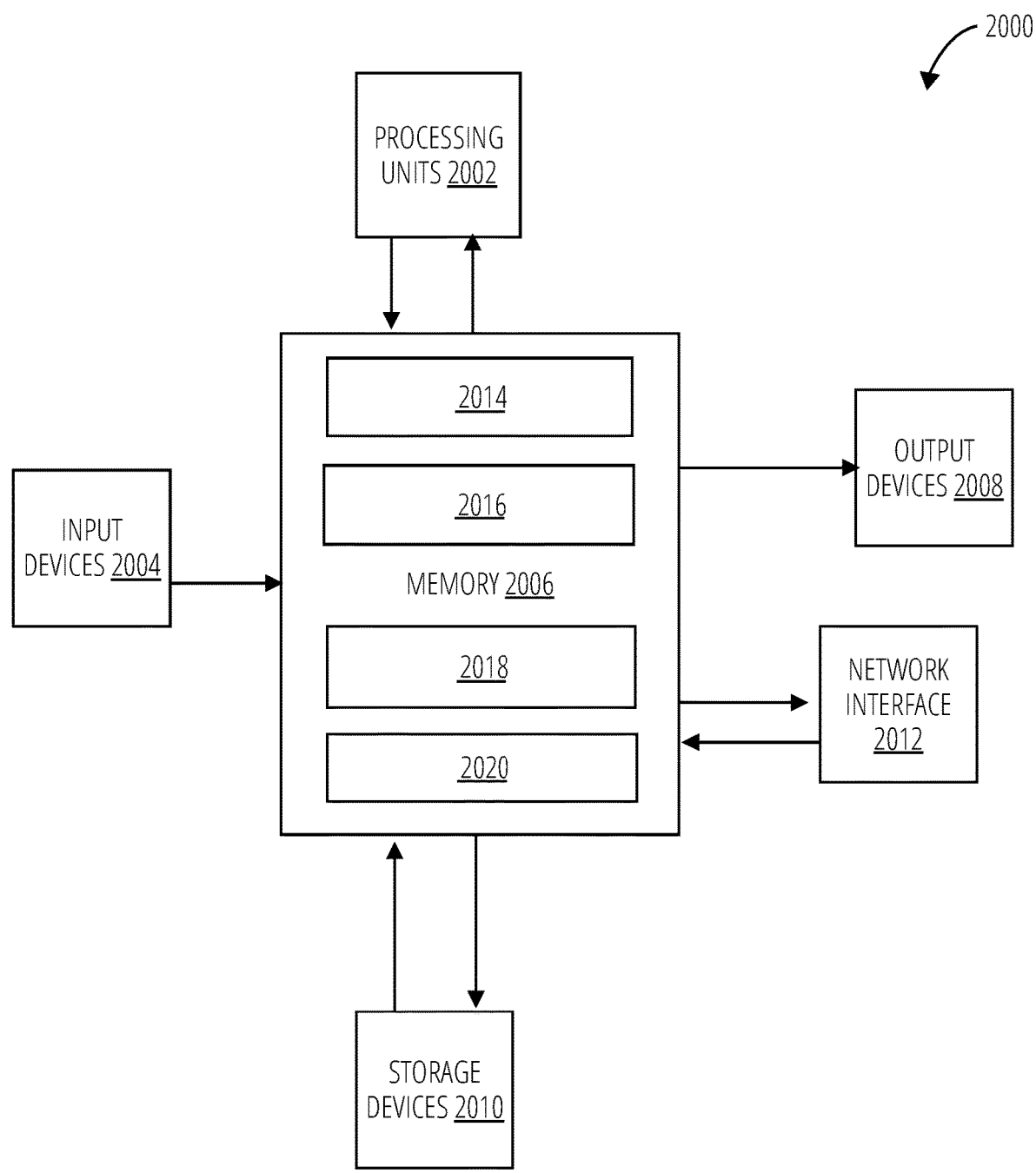
Figure 21:
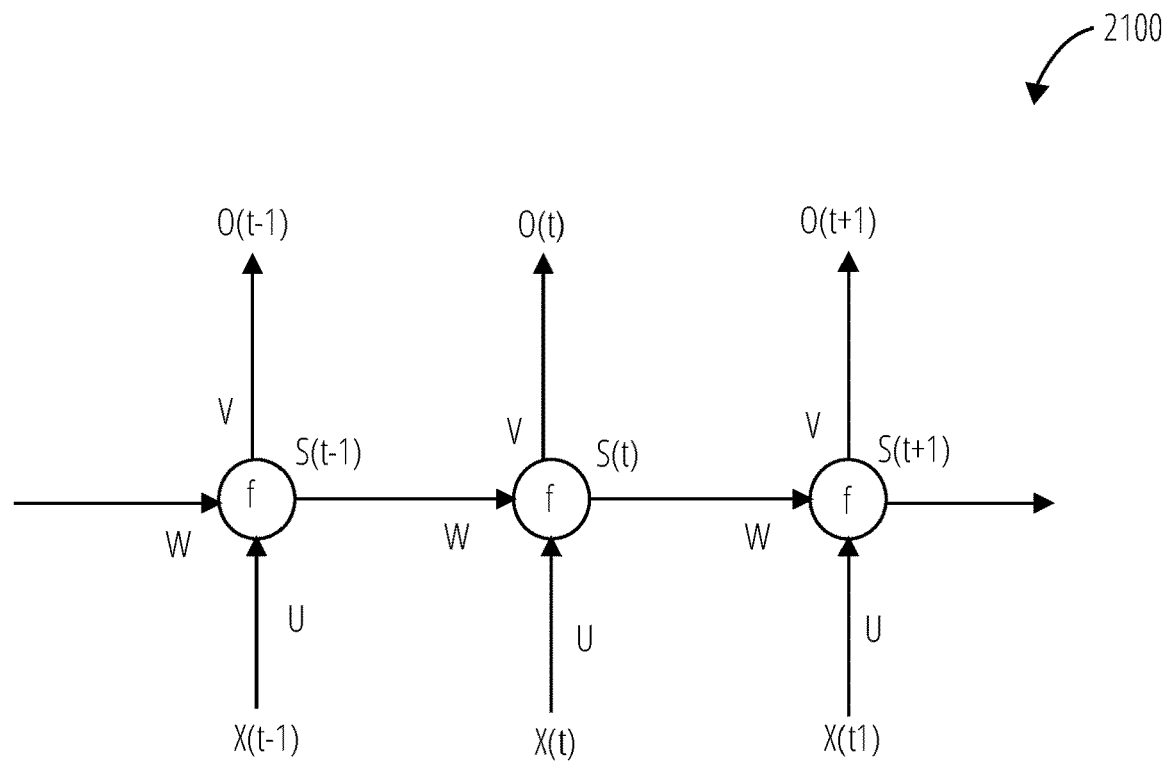
Figure 22:
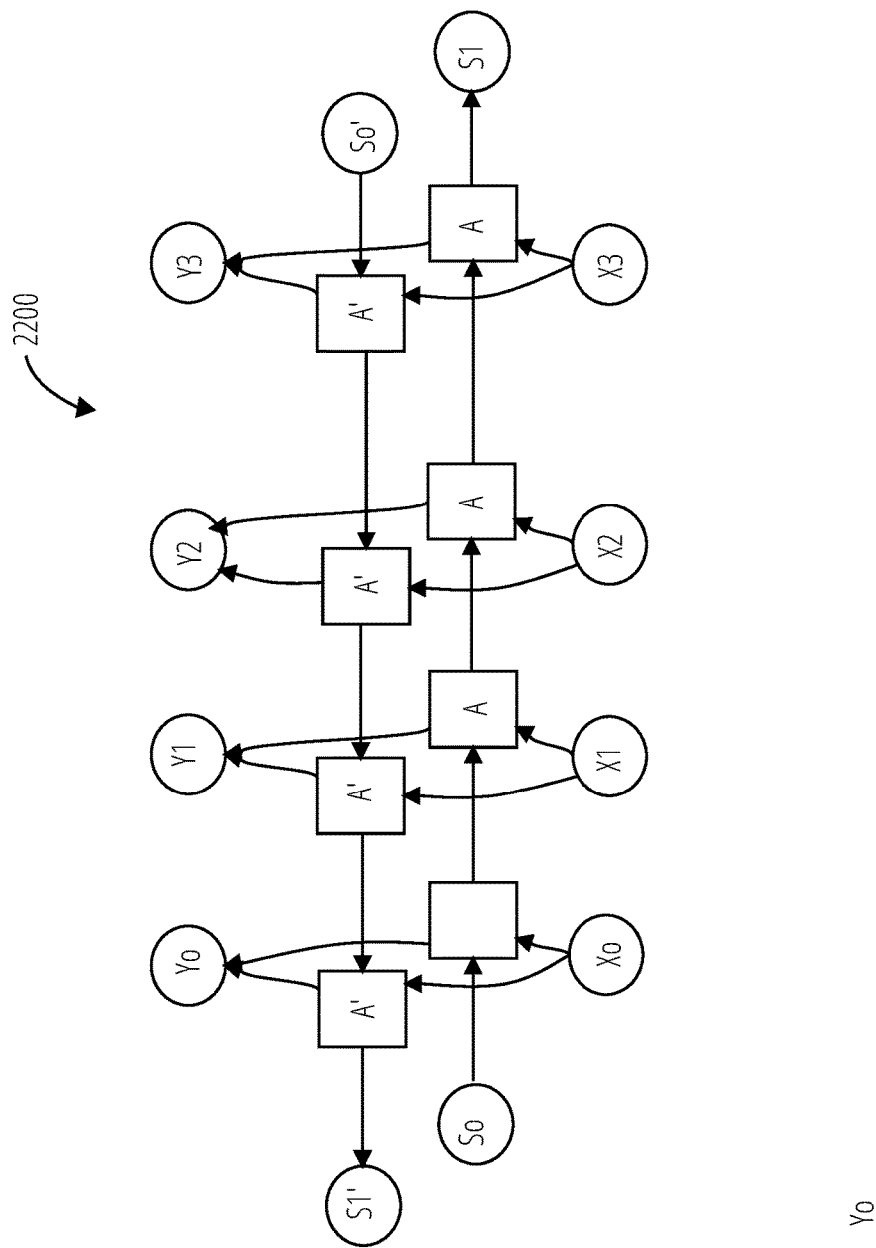
Figure 23:
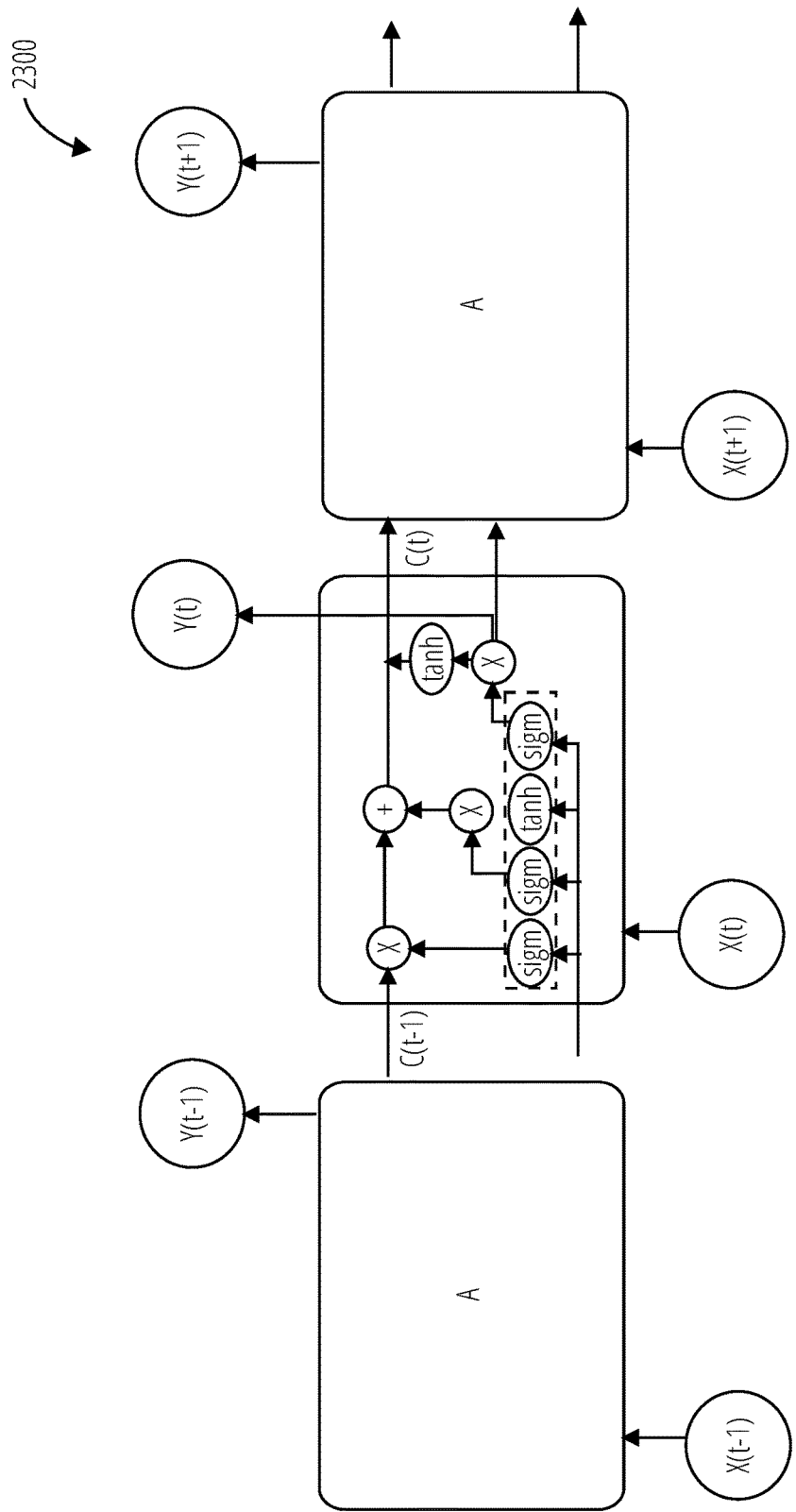
Figure 24:
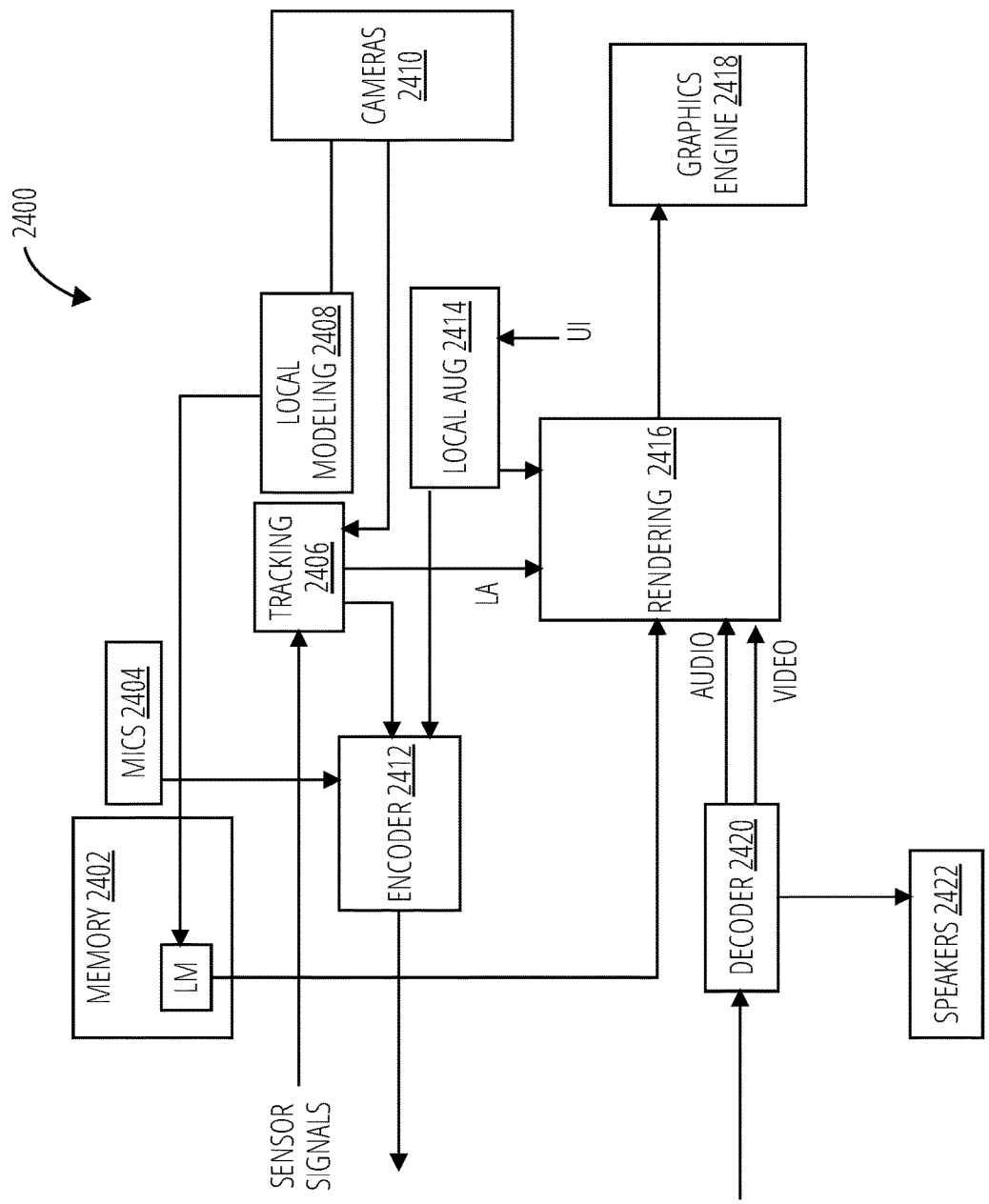
Figure 25:
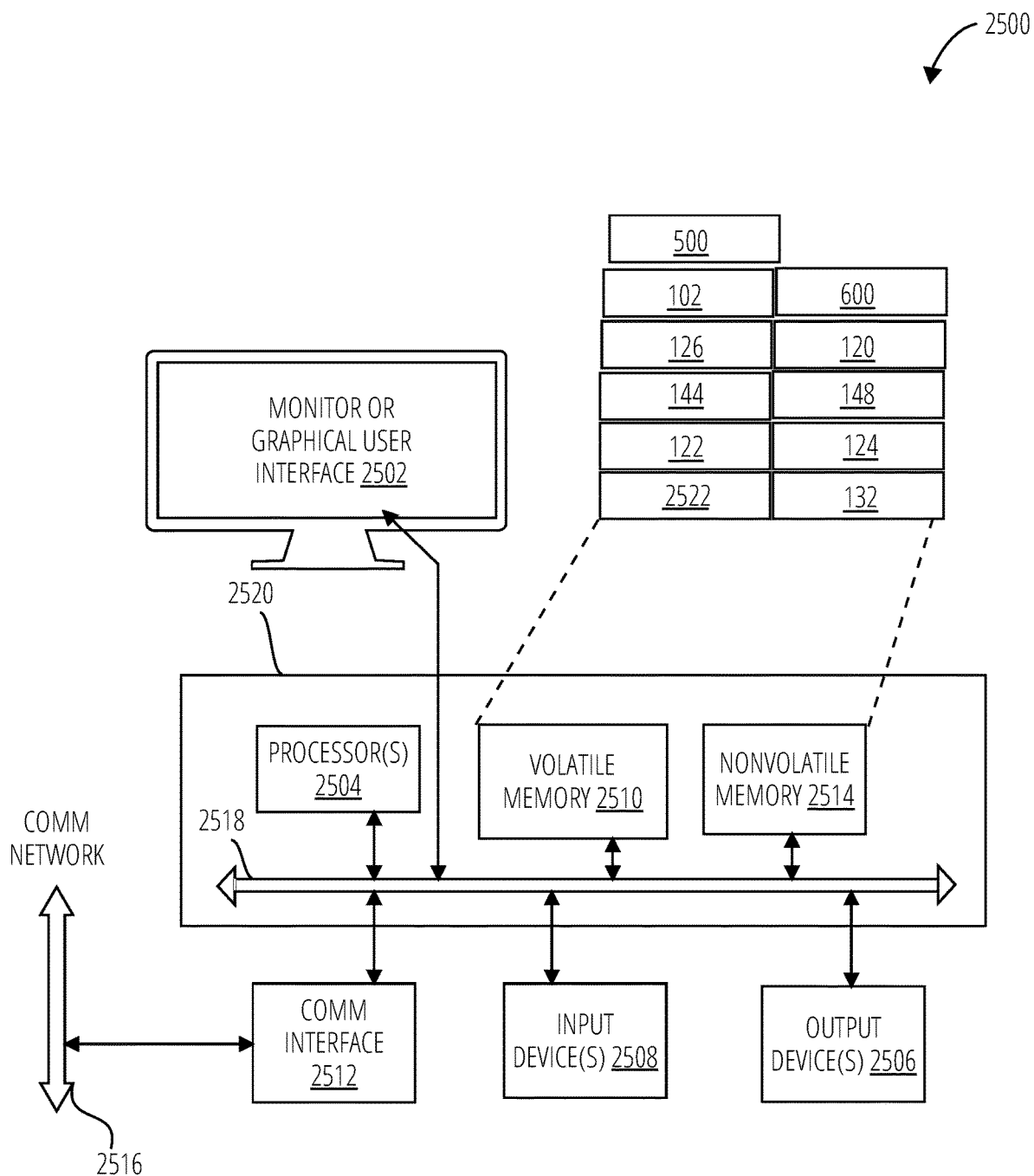

FIG. 5 is an example block diagram of a computing device 500 that may incorporate embodiments of the present invention. FIG. 5 is merely illustrative of a machine system to carry out aspects of the technical processes described herein, and does not limit the scope of the claims. One of ordinary skill in the art would recognize other variations, modifications, and alternatives. In one embodiment, the computing device 500 typically includes a monitor or graphical user interface 502, a data processing system 520, a communication network interface 512, input device(s) 508, output device(s) 506, and the like.

As depicted in FIG. 5, the data processing system 520 may include one or more processor(s) 504 that communicate with a number of peripheral devices via a bus subsystem 518. These peripheral devices may include input device(s) 508, output device(s) 506, communication network interface 512, and a storage subsystem, such as a volatile memory 510 and a nonvolatile memory 514.

The volatile memory 510 and/or the nonvolatile memory 514 may store computer-executable instructions and thus forming logic 522 that when applied to and executed by the processor(s) 504 implement embodiments of the processes disclosed herein.

The input device(s) 508 include devices and mechanisms for inputting information to the data processing system 520. These may include a keyboard, a keypad, a touch screen incorporated into the monitor or graphical user interface 502, audio input devices such as voice recognition systems, microphones, and other types of input devices. In various embodiments, the input device(s) 508 may be embodied as a computer mouse, a trackball, a track pad, a joystick, wireless remote, drawing tablet, voice command system, eye tracking system, and the like. The input device(s) 508 typically allow a user to select objects, icons, control areas, text and the like that appear on the monitor or graphical user interface 502 via a command such as a click of a button or the like.

The input device(s) 508 may incorporate gesture inputs for programming instructions (interactive procedural guidance) for the movement of objects between different locations. The gestures inputs may be (motion tracking AR tracking techniques environment sensors, stereo camera, user worn sensors) gestures input recognition may be initiated, confirmed, and ended by a user trigger input such as a voice input provided by detecting the movement of the user in the environment by external facing sensors (e.g., image sensors, laser sensors Lidar, radar, etc.,).

The output device(s) 506 include devices and mechanisms for outputting information from the data processing system 520. These may include the monitor or graphical user interface 502, speakers, printers, infrared LEDs, and so on as well understood in the art.

The communication network interface 512 provides an interface to communication networks (e.g., communication network 516) and devices external to the data processing system 520. The communication network interface 512 may serve as an interface for receiving data from and transmitting data to other systems. Embodiments of the communication network interface 512 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 512 may be coupled to the communication network 516 via an antenna, a cable, or the like. In some embodiments, the communication network interface 512 may be physically integrated on a circuit board of the data processing system 520, or in some cases may be implemented in software or firmware, such as "soft modems", or the like.

The computing device 500 may include logic that enables communications over a network using protocols such as HTTP, TCP/IP, RTP/RTSP, IPX, UDP and the like.

The volatile memory 510 and the nonvolatile memory 514 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 510 and the nonvolatile memory 514 may be configured to store the basic programming and data constructs that provide the functionality of the disclosed processes and other embodiments thereof that fall within the scope of the present invention.

Logic 522 that implements embodiments of the present invention may be stored in the volatile memory 510 and/or the nonvolatile memory 514. The volatile memory 510 and the nonvolatile memory 514 includes logic for the object recognition engine 130, the spatiotemporal activity engine 120, the correlator 122, the constructor 144, the combiner 148, the interpreter 124, the compiler 118, and the protocol development user interface 140. Said logic 522 may be read from the volatile memory 510 and/or nonvolatile memory 514 and executed by the processor(s) 504. The volatile memory 510 and the nonvolatile memory 514 may also provide a repository for storing data used by the logic 522.

The volatile memory 510 and the nonvolatile memory 514 may include a number of memories including a main random access memory (RAM) for storage of instructions and data during program execution and a read only memory (ROM) in which read-only non-transitory instructions are stored. The volatile memory 510 and the nonvolatile memory 514 may include a file storage subsystem providing persistent (non-volatile) storage for program and data files. The volatile memory 510 and the nonvolatile memory 514 may include removable storage systems, such as removable flash memory.

The bus subsystem 518 provides a mechanism for enabling the various components and subsystems of data processing system 520 communicate with each other as intended. Although the communication network interface 512 is depicted schematically as a single bus, some embodiments of the bus subsystem 518 may utilize multiple distinct busses.

It will be readily apparent to one of ordinary skill in the art that the computing device 500 may be a device such as a smartphone, a desktop computer, a laptop computer, a rack-mounted computer system, a computer server, or a tablet computer device. As commonly known in the art, the computing device 500 may be implemented as a collection of multiple networked computing devices. Further, the computing device 500 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to" Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

What is claimed is:

1. An augmented procedural language and content generation system comprising:
one or more processor; and
one or more machine-readable medium comprising instructions that, when applied to the one or more processor, configure the one or more processor to:
generate first correlations between (a) detected environment objects and detected environmental object movement, and (b) one or more environment sensor input to an augmented reality device;
evaluate the first correlations against a known objects library, a protocol library, and declared objects to generate programmatic instructions;
compile the instruction set into executable commands;
configure control logic to perform the executable commands in response to the detected environment objects and detected environmental object movement;
generate an augmented reality layer in response to at least one of the executed commands; and
superimpose the augmented reality layer over an environment image layer in the augmented reality device.

2. The system of claim 1, the instructions, when applied to the one or more processor, further configuring the one or more processor to:
during performance of the executable commands, generate second correlations of (a) the environment image layer and the augmented reality layer, and (b) a user-activated edit control;
evaluate the second correlations against the known objects library, the protocol library, the declared objects, and stored programmatic instructions for the in progress instruction set to generate revised programmatic instructions;
update the stored programmatic instructions with the revised programmatic instructions;
compile the revised programmatic instructions into revised executable commands;
configure the control logic to perform the revised executable commands in response to the detected environment objects and the detected environmental object movement;
generate a revised augmented reality layer in response to at least one of the revised executable commands; and
superimpose the revised augmented reality layer over the environment image layer in the augmented reality device.

3. The system of claim 1, the instructions, when applied to the one or more processor, further configuring the one or more processor to:
operate an object recognition engine and a spatiotemporal activity engine to detect the environment objects and the object movement.

4. The system of claim 3, wherein the object recognition engine and the spatiotemporal activity engine utilize at least one neural network for detecting and classifying the environment objects and tracking the environmental object movement.

5. The system of claim 1, the instructions, when applied to the one or more processor, further configuring the one or more processor to:
generate a flow diagram for the programmatic instructions on a protocol development user interface.

6. The system of claim 5, wherein the protocol development user interface generates a three dimensional protocol workflow.

7. A non-transitory machine-readable medium comprising instructions that, when applied to one or more computer processor, configure the one or more computer processor to:
generate first correlations between (a) detected environment objects and detected environmental object movement, and (b) one or more environment sensor input to an augmented reality device;
evaluate the first correlations against a known objects library, a protocol library, and declared objects to generate programmatic instructions;
compile the instruction set into executable commands;
configure control logic to perform the executable commands in response to the detected environment objects and detected environmental object movement;
generate an augmented reality layer in response to at least one of the executed commands; and
superimpose the augmented reality layer over an environment image layer in the augmented reality device.

8. The non-transitory machine-readable medium of claim 7, wherein the instructions, when applied to the one or more computer processor, further configure the one or more computer processor to:
during performance of the executable commands, generate second correlations of (a) the environment image layer and the augmented reality layer, and (b) a user-activated edit control;
evaluate the second correlations against the known objects library, the protocol library, the declared objects, and stored programmatic instructions for the in progress instruction set to generate revised programmatic instructions;
update the stored programmatic instructions with the revised programmatic instructions;
compile the revised programmatic instructions into revised executable commands;
configure the control logic to perform the revised executable commands in response to the detected environment objects and the detected environmental object movement;
generate a revised augmented reality layer in response to at least one of the revised executable commands; and
superimpose the revised augmented reality layer over the environment image layer in the augmented reality device.

9. The non-transitory machine-readable medium of claim 7, wherein the instructions, when applied to the one or more computer processor, further configure the one or more computer processor to:
operate an object recognition engine and a spatiotemporal activity engine to detect the environment objects and the object movement.

10. The non-transitory machine-readable medium of claim 9, wherein the object recognition engine and the spatiotemporal activity engine utilize at least one neural network for detecting and classifying the environment objects and tracking the environmental object movement.

11. The non-transitory machine-readable medium of claim 7, wherein the instructions, when applied to the one or more computer processor, further configure the one or more computer processor to:
generate a flow diagram for the programmatic instructions on a protocol development user interface.

12. The non-transitory machine-readable medium of claim 11, wherein the protocol development user interface generates a three dimensional protocol workflow.

13. A method of operating a procedural language and content generation system comprises:

generating first correlations between (a) detected environment objects and detected environmental object movement, and (b) one or more environment sensor input to an augmented reality device;

evaluating the first correlations against a known objects library, a protocol library, and declared objects to generate programmatic instructions;

compiling the instruction set into executable commands;

configuring control logic to perform the executable commands in response to the detected environment objects and detected environmental object movement;

generating an augmented reality layer in response to at least one of the executed commands; and superimposing the augmented reality layer over an environment image layer in the augmented reality device.

14. The method of claim 13 further comprises:

during performance of the executable commands, generating second correlations of (a) the environment image layer and the augmented reality layer, and (b) a user-activated edit control;

evaluating the second correlations against the known objects library, the protocol library, the declared objects, and stored programmatic instructions for the in progress instruction set to generate revised programmatic instructions;

updating the stored programmatic instructions with the revised programmatic instructions;

compiling the revised programmatic instructions into revised executable commands;

configuring the control logic to perform the revised executable commands in response to the detected environment objects and the detected environmental object movement;

generating a revised augmented reality layer in response to at least one of the revised executable commands; and superimposing the revised augmented reality layer over the environment image layer in the augmented reality device.

15. The method of claim 13, further comprising:

operating an object recognition engine and a spatiotemporal activity engine to detect the environment objects and the object movement.

16. The method of claim 15, wherein the object recognition engine and the spatiotemporal activity engine utilize at least one neural network for detecting and classifying the environment objects and tracking the environmental object movement.

17. The method of claim 13, further comprising generating a flow diagram for the programmatic instructions on a protocol development user interface.

18. The method of claim 17, wherein the protocol development user interface generates a three dimensional protocol workflow.

* * * * *